(12) United States Patent
Ferlitsch

(10) Patent No.: US 8,345,272 B2
(45) Date of Patent: Jan. 1, 2013

(54) METHODS AND SYSTEMS FOR THIRD-PARTY CONTROL OF REMOTE IMAGING JOBS

(75) Inventor: Andrew Rodney Ferlitsch, Camas, WA (US)

(73) Assignee: Sharp Laboratories of America, Inc., Camas, WA (US)

( * ) Notice: Subject to any disclaimer, the term of this patent is extended or adjusted under 35 U.S.C. 154(b) by 1230 days.

(21) Appl. No.: 11/536,115

(22) Filed: Sep. 28, 2006

(65) Prior Publication Data
US 2008/0079974 A1 Apr. 3, 2008

(51) Int. Cl.
G06F 3/12 (2006.01)
G06K 15/00 (2006.01)
H04N 1/60 (2006.01)
H04N 1/21 (2006.01)
H04N 1/387 (2006.01)

(52) U.S. Cl. ...... 358/1.13; 358/1.1; 358/1.14; 358/1.15; 358/1.9; 358/302; 358/450

(58) Field of Classification Search ........... 358/1.1, 358/1.13, 1.14, 1.15, 1.19, 1.9, 450, 302, 358/376
See application file for complete search history.

(56) References Cited

U.S. PATENT DOCUMENTS

| | | | |
|---|---|---|---|
| 5,085,587 A | 2/1992 | DesForges et al. |
| 5,228,100 A | 7/1993 | Takeda et al. |
| 5,323,393 A | 6/1994 | Barrett et al. |
| 5,365,494 A | 11/1994 | Lynch |
| 5,410,646 A | 4/1995 | Tondevold et al. |
| 5,504,589 A | 4/1996 | Montague et al. |
| 5,513,112 A | 4/1996 | Herring et al. |
| 5,542,031 A | 7/1996 | Douglass et al. |
| 5,586,260 A | 12/1996 | Hu |
| 5,659,845 A | 8/1997 | Krist et al. |
| 5,664,206 A | 9/1997 | Murow et al. |
| 5,671,412 A | 9/1997 | Christiano |
| 5,699,493 A | 12/1997 | Davidson et al. |
| 5,699,494 A | 12/1997 | Colbert et al. |
| 5,717,439 A | 2/1998 | Levine et al. |
| 5,726,883 A | 3/1998 | Levine et al. |
| 5,727,082 A | 3/1998 | Sugishima |
| 5,727,135 A | 3/1998 | Webb et al. |
| 5,745,712 A | 4/1998 | Turpin et al. |
| 5,745,883 A | 4/1998 | Krist et al. |
| 5,760,775 A | 6/1998 | Sklut et al. |
| 5,774,678 A | 6/1998 | Motoyama |
| 5,778,356 A | 7/1998 | Heiny |

(Continued)

FOREIGN PATENT DOCUMENTS
EP 1160657 12/2001
(Continued)

OTHER PUBLICATIONS

Ratha, N.K., Connell, J.H., Bolle, R.M. "Enhancing security and privacy in biometrics-based authentication systems". IBM Systems Journal 40(3), pp. 614-634 (2001).

(Continued)

*Primary Examiner* — Steven Kau
*Assistant Examiner* — Neil R McLean
(74) *Attorney, Agent, or Firm* — Krieger Intellectual Property, Inc.; Scott C. Krieger

(57) ABSTRACT

Embodiments of the present invention comprise systems and methods for third-party control of remote imaging jobs.

12 Claims, 8 Drawing Sheets

U.S. PATENT DOCUMENTS

| | | | |
|---|---|---|---|
| 5,791,790 | A | 8/1998 | Bender et al. |
| 5,796,934 | A | 8/1998 | Bhanot et al. |
| 5,799,206 | A | 8/1998 | Kitagawa et al. |
| 5,799,289 | A | 8/1998 | Fukushima et al. |
| 5,812,818 | A | 9/1998 | Adler et al. |
| 5,832,264 | A | 11/1998 | Hart et al. |
| 5,848,231 | A | 12/1998 | Teitelbaum et al. |
| 5,877,776 | A | 3/1999 | Beaman et al. |
| 5,915,001 | A | 6/1999 | Uppaluru, V. |
| 5,944,824 | A | 8/1999 | He |
| 5,956,487 | A | 9/1999 | Venkatraman et al. |
| 5,956,698 | A | 9/1999 | Lacheze et al. |
| 5,968,127 | A | 10/1999 | Kawabe et al. |
| 5,993,088 | A | 11/1999 | Nogay et al. |
| 5,995,553 | A | 11/1999 | Crandall et al. |
| 5,999,708 | A | 12/1999 | Kajita |
| 6,042,384 | A | 3/2000 | Loiacono |
| 6,044,382 | A | 3/2000 | Martino |
| 6,069,706 | A | 5/2000 | Kajita |
| 6,075,860 | A | 6/2000 | Ketcham |
| 6,115,132 | A | 9/2000 | Nakatsuma et al. |
| 6,118,546 | A | 9/2000 | Sanchez |
| 6,128,731 | A | 10/2000 | Zarrin et al. |
| 6,141,662 | A | 10/2000 | Jeyachandran |
| 6,148,346 | A | 11/2000 | Hanson |
| 6,161,139 | A | 12/2000 | Win et al. |
| 6,178,308 | B1 | 1/2001 | Bobrow et al. |
| 6,199,080 | B1 | 3/2001 | Nielsen |
| 6,213,652 | B1 | 4/2001 | Suzuki et al. |
| 6,216,113 | B1 | 4/2001 | Aikens et al. |
| 6,233,409 | B1 | 5/2001 | Haines et al. |
| 6,239,802 | B1 | 5/2001 | Lahey et al. |
| 6,240,456 | B1 | 5/2001 | Teng et al. |
| 6,246,487 | B1 | 6/2001 | Kobayashi |
| 6,292,267 | B1 | 9/2001 | Mori et al. |
| 6,301,016 | B1 | 10/2001 | Matsueda et al. |
| 6,307,640 | B1 | 10/2001 | Motegi |
| 6,311,040 | B1 | 10/2001 | Kucinski et al. |
| 6,349,275 | B1 | 2/2002 | Schumacher et al. |
| 6,353,878 | B1 | 3/2002 | Dunham |
| 6,369,905 | B1 | 4/2002 | Mitsuhashi et al. |
| 6,407,820 | B1 | 6/2002 | Hansen et al. |
| 6,426,798 | B1 | 7/2002 | Yeung |
| 6,433,883 | B1 | 8/2002 | Kajita |
| 6,438,589 | B1 | 8/2002 | Iwata |
| 6,462,756 | B1 | 10/2002 | Hansen et al. |
| 6,476,926 | B1 | 11/2002 | Yano et al. |
| 6,490,547 | B1 | 12/2002 | Atkin et al. |
| 6,490,601 | B1 | 12/2002 | Markus et al. |
| 6,509,974 | B1 | 1/2003 | Hansen |
| 6,510,466 | B1 | 1/2003 | Cox et al. |
| 6,516,157 | B1 | 2/2003 | Maruta et al. |
| 6,526,258 | B2 | 2/2003 | Bejar et al. |
| 6,567,179 | B1 | 5/2003 | Sato et al. |
| 6,590,589 | B1 | 7/2003 | Sluiman |
| 6,590,673 | B2 | 7/2003 | Kadowaki |
| 6,592,275 | B1 | 7/2003 | Aihara et al. |
| 6,597,469 | B1 | 7/2003 | Kuroyanagi |
| 6,604,157 | B1 | 8/2003 | Brusky et al. |
| 6,621,422 | B2 | 9/2003 | Rubenstein |
| 6,623,529 | B1 | 9/2003 | Lakritz |
| 6,636,929 | B1 | 10/2003 | Frantz et al. |
| 6,643,650 | B1 | 11/2003 | Slaughter et al. |
| 6,652,169 | B2 | 11/2003 | Parry |
| 6,685,637 | B1 | 2/2004 | Rom |
| 6,707,466 | B1 | 3/2004 | Van Sickle et al. |
| 6,721,286 | B1 | 4/2004 | Williams et al. |
| 6,735,773 | B1 | 5/2004 | Trinh et al. |
| 6,749,434 | B2 | 6/2004 | Stuppy |
| 6,772,945 | B2 | 8/2004 | Mahoney et al. |
| 6,775,729 | B1 | 8/2004 | Matsuo et al. |
| 6,823,225 | B1 | 11/2004 | Sass |
| 6,826,727 | B1 | 11/2004 | Mohr et al. |
| 6,836,845 | B1 | 12/2004 | Lennie et al. |
| 6,850,252 | B1 | 2/2005 | Hoffberg |
| 6,854,839 | B2 | 2/2005 | Collier et al. |
| 6,862,110 | B2 | 3/2005 | Harrington |
| 6,862,583 | B1 | 3/2005 | Mazzagatte et al. |
| 6,865,716 | B1 | 3/2005 | Thurston |
| 6,873,429 | B2 | 3/2005 | Matsuura |
| 6,874,010 | B1 | 3/2005 | Sargent |
| 6,904,412 | B1 | 6/2005 | Broadbent et al. |
| 6,915,525 | B2 | 7/2005 | Ozawa |
| 6,934,706 | B1 | 8/2005 | Mancuso et al. |
| 6,934,740 | B1 | 8/2005 | Lawande et al. |
| 6,940,532 | B1 | 9/2005 | Fukui et al. |
| 6,948,175 | B1 | 9/2005 | Fong et al. |
| 6,951,303 | B2 | 10/2005 | Petersen et al. |
| 6,964,014 | B1 | 11/2005 | Parish |
| 6,975,820 | B2 | 12/2005 | Wong |
| 6,999,987 | B1 | 2/2006 | Billingsley et al. |
| 7,003,723 | B1 | 2/2006 | Kremer et al. |
| 7,007,026 | B2 | 2/2006 | Wilkinson et al. |
| 7,012,706 | B1 | 3/2006 | Hansen |
| 7,013,289 | B2 | 3/2006 | Horn et al. |
| 7,019,753 | B2 | 3/2006 | Rappaport et al. |
| 7,034,958 | B1 | 4/2006 | Hara |
| 7,072,057 | B1 | 7/2006 | Hansen |
| 7,079,143 | B2 | 7/2006 | Gilbert |
| 7,095,513 | B2 | 8/2006 | Stringham |
| 7,107,285 | B2 | 9/2006 | von Kaenel et al. |
| 7,107,615 | B2 | 9/2006 | Cossel et al. |
| 7,117,504 | B2 | 10/2006 | Smith et al. |
| 7,124,097 | B2 | 10/2006 | Claremont et al. |
| 7,126,717 | B2 | 10/2006 | Jeyachandran |
| 7,127,700 | B2 | 10/2006 | Large |
| 7,136,909 | B2 | 11/2006 | Balasuriya |
| 7,136,941 | B2 | 11/2006 | Nguyen et al. |
| 7,143,364 | B1 | 11/2006 | Tam |
| 7,145,673 | B1 | 12/2006 | Lin |
| 7,145,686 | B2 | 12/2006 | Simpson et al. |
| 7,149,697 | B2 | 12/2006 | Zerza et al. |
| 7,149,964 | B1 | 12/2006 | Cottrille et al. |
| 7,162,103 | B2 | 1/2007 | Meunier et al. |
| 7,170,618 | B2 | 1/2007 | Fujitani et al. |
| 7,171,615 | B2 | 1/2007 | Jensen et al. |
| 7,174,056 | B2 | 2/2007 | Silverbrook et al. |
| 7,177,814 | B2 | 2/2007 | Gong et al. |
| 7,181,017 | B1 | 2/2007 | Nagel et al. |
| 7,181,442 | B2 | 2/2007 | Yeh et al. |
| 7,185,078 | B2 | 2/2007 | Pleyer et al. |
| 7,188,125 | B1 | 3/2007 | Karr |
| 7,188,181 | B1 | 3/2007 | Squier et al. |
| 7,191,391 | B2 | 3/2007 | Takashima |
| 7,191,393 | B1 | 3/2007 | Chin et al. |
| 7,197,615 | B2 | 3/2007 | Arakawa et al. |
| 7,203,699 | B2 | 4/2007 | Bellamy |
| 7,212,301 | B2 | 5/2007 | Treibach-Heck et al. |
| 7,216,292 | B1 | 5/2007 | Snapper et al. |
| 7,216,347 | B1 | 5/2007 | Harrison et al. |
| 7,228,501 | B2 | 6/2007 | Brown et al. |
| 7,233,929 | B1 | 6/2007 | Lingle et al. |
| 7,233,973 | B2 | 6/2007 | Melet et al. |
| 7,234,110 | B2 | 6/2007 | Sumitomo |
| 7,239,409 | B2 * | 7/2007 | Parry ........................ 358/1.15 |
| 7,249,100 | B2 | 7/2007 | Murto et al. |
| RE39,808 | E | 9/2007 | Motegi |
| 7,268,896 | B2 | 9/2007 | Bellagamba et al. |
| 7,272,269 | B2 | 9/2007 | Tojo et al. |
| 7,275,044 | B2 | 9/2007 | Chauvin et al. |
| 7,284,061 | B2 | 10/2007 | Matsubayashi et al. |
| 7,284,199 | B2 | 10/2007 | Parasnis et al. |
| 7,293,034 | B2 | 11/2007 | Paya et al. |
| 7,296,221 | B1 | 11/2007 | Treibach-Heck et al. |
| 7,301,658 | B2 | 11/2007 | Henry |
| 7,305,616 | B1 | 12/2007 | Nelson et al. |
| 7,313,587 | B1 | 12/2007 | Dharmarajan |
| 7,321,440 | B2 | 1/2008 | Kimura |
| 7,325,196 | B1 | 1/2008 | Covington et al. |
| 7,327,478 | B2 | 2/2008 | Matsuda |
| 7,328,245 | B1 | 2/2008 | Hull et al. |
| 7,340,389 | B2 | 3/2008 | Vargas |
| 7,343,551 | B1 | 3/2008 | Bourdev |
| 7,349,949 | B1 | 3/2008 | Connor et al. |
| 7,363,586 | B1 | 4/2008 | Briggs et al. |
| 7,397,362 | B2 | 7/2008 | Zhang et al. |
| 7,404,204 | B2 | 7/2008 | Davenport et al. |

| Patent/Publication | Date | Inventor(s) |
|---|---|---|
| 7,406,660 B1 | 7/2008 | Sikchi et al. |
| 7,412,374 B1 | 8/2008 | Seiler et al. |
| 7,424,129 B2 | 9/2008 | Hull et al. |
| 7,437,406 B2 | 10/2008 | Hauduc et al. |
| 7,437,663 B2 | 10/2008 | Lakhdhir et al. |
| 7,441,188 B1 | 10/2008 | Russell et al. |
| 7,444,519 B2 | 10/2008 | Laferriere et al. |
| 7,444,590 B2 | 10/2008 | Christian et al. |
| 7,451,117 B2 | 11/2008 | Cozianu et al. |
| 7,451,392 B1 | 11/2008 | Chalecki et al. |
| 7,454,623 B2 | 11/2008 | Hardt |
| 7,467,211 B1 | 12/2008 | Herman et al. |
| 7,472,343 B2 | 12/2008 | Vasey |
| 7,478,171 B2 | 1/2009 | Ramaswamy et al. |
| 7,490,167 B2 | 2/2009 | Pena et al. |
| 7,496,837 B1 | 2/2009 | Larcheveque et al. |
| 7,500,178 B1 | 3/2009 | O'Donnell |
| 7,508,535 B2 | 3/2009 | Hart et al. |
| 7,509,649 B2 | 3/2009 | Shenfield |
| 7,545,528 B2 | 6/2009 | Takabayashi et al. |
| 7,548,334 B2 | 6/2009 | Lo et al. |
| 7,552,265 B2 * | 6/2009 | Newman et al. .............. 710/305 |
| 7,565,554 B2 | 7/2009 | Joosten et al. |
| 7,567,360 B2 | 7/2009 | Takahashi et al. |
| 7,573,593 B2 | 8/2009 | Hart et al. |
| 7,599,942 B1 | 10/2009 | Mohamad |
| 7,657,557 B2 | 2/2010 | Super |
| 7,729,363 B2 | 6/2010 | Shenfield et al. |
| 7,826,081 B2 | 11/2010 | Stevens et al. |
| 7,886,219 B2 | 2/2011 | Lund |
| 7,904,600 B2 | 3/2011 | Madril et al. |
| 7,920,101 B2 | 4/2011 | Lum et al. |
| 7,941,743 B2 | 5/2011 | Reddy et al. |
| 7,941,744 B2 | 5/2011 | Oppenlander et al. |
| 7,975,214 B2 | 7/2011 | Boegelund et al. |
| 8,006,176 B2 | 8/2011 | Reddy et al. |
| 8,037,402 B2 | 10/2011 | Foushee et al. |
| 8,049,677 B2 | 11/2011 | Lum et al. |
| 8,060,556 B2 | 11/2011 | Krane et al. |
| 2001/0021945 A1 | 9/2001 | Matsuura |
| 2001/0027439 A1 | 10/2001 | Holtzman et al. |
| 2001/0027527 A1 | 10/2001 | Khidekel et al. |
| 2001/0028808 A1 | 10/2001 | Nomura et al. |
| 2001/0038462 A1 | 11/2001 | Teeuwen et al. |
| 2001/0039614 A1 | 11/2001 | Hellberg et al. |
| 2001/0044787 A1 | 11/2001 | Shwartz et al. |
| 2002/0016921 A1 | 2/2002 | Olsen et al. |
| 2002/0020750 A1 | 2/2002 | Dymetman et al. |
| 2002/0029256 A1 | 3/2002 | Zintel et al. |
| 2002/0032745 A1 | 3/2002 | Honda |
| 2002/0049786 A1 | 4/2002 | Bibliowicz et al. |
| 2002/0052916 A1 | 5/2002 | Kloba et al. |
| 2002/0055984 A1 | 5/2002 | Chang et al. |
| 2002/0059265 A1 | 5/2002 | Valorose, III |
| 2002/0073148 A1 | 6/2002 | Haines et al. |
| 2002/0080381 A1 | 6/2002 | Haines |
| 2002/0089691 A1 | 7/2002 | Fertlitsch et al. |
| 2002/0093676 A1 | 7/2002 | Parry |
| 2002/0098027 A1 | 7/2002 | Koike et al. |
| 2002/0099796 A1 | 7/2002 | Chou |
| 2002/0103827 A1 | 8/2002 | Sesek |
| 2002/0105664 A1 | 8/2002 | Inoue et al. |
| 2002/0107939 A1 | 8/2002 | Ford et al. |
| 2002/0109718 A1 | 8/2002 | Mansour et al. |
| 2002/0112037 A1 | 8/2002 | Koss |
| 2002/0120792 A1 | 8/2002 | Blair |
| 2002/0138279 A1 | 9/2002 | Al-Kazily et al. |
| 2002/0138476 A1 | 9/2002 | Suwa et al. |
| 2002/0138666 A1 | 9/2002 | Fujisawa |
| 2002/0145627 A1 | 10/2002 | Whitmarsh |
| 2002/0147858 A1 | 10/2002 | Motoyama et al. |
| 2002/0152183 A1 | 10/2002 | Soares et al. |
| 2002/0152235 A1 | 10/2002 | Motoyama et al. |
| 2002/0152302 A1 | 10/2002 | Motoyama et al. |
| 2002/0156688 A1 | 10/2002 | Horn et al. |
| 2002/0156795 A1 * | 10/2002 | Edwards et al. .......... 707/103 R |
| 2002/0156846 A1 | 10/2002 | Rawat et al. |
| 2002/0171857 A1 | 11/2002 | Hisatomi |
| 2002/0194180 A1 | 12/2002 | Alsop et al. |
| 2002/0194350 A1 | 12/2002 | Lu et al. |
| 2003/0002074 A1 | 1/2003 | Miyano |
| 2003/0007170 A1 | 1/2003 | Kajita et al. |
| 2003/0011633 A1 * | 1/2003 | Conley et al. .................. 345/762 |
| 2003/0011640 A1 | 1/2003 | Green |
| 2003/0014515 A1 | 1/2003 | Motoyama et al. |
| 2003/0014529 A1 | 1/2003 | Simpson et al. |
| 2003/0033369 A1 | 2/2003 | Bernhard |
| 2003/0035133 A1 | 2/2003 | Berkema et al. |
| 2003/0038965 A1 | 2/2003 | Simpson et al. |
| 2003/0043205 A1 | 3/2003 | Hill |
| 2003/0043396 A1 | 3/2003 | Klosterman et al. |
| 2003/0043405 A1 | 3/2003 | Hill |
| 2003/0048470 A1 | 3/2003 | Garcia |
| 2003/0048473 A1 | 3/2003 | Rosen |
| 2003/0049037 A1 | 3/2003 | Sadowara et al. |
| 2003/0053123 A1 | 3/2003 | Wu et al. |
| 2003/0063313 A1 | 4/2003 | Ito |
| 2003/0065766 A1 | 4/2003 | Parry |
| 2003/0065791 A1 | 4/2003 | Garg et al. |
| 2003/0065985 A1 | 4/2003 | McGeorge, Jr. |
| 2003/0074267 A1 | 4/2003 | Acharya et al. |
| 2003/0074312 A1 | 4/2003 | White |
| 2003/0081240 A1 * | 5/2003 | Soto et al. .................... 358/1.15 |
| 2003/0084114 A1 | 5/2003 | Simpson et al. |
| 2003/0084302 A1 | 5/2003 | de Jong et al. |
| 2003/0088642 A1 | 5/2003 | Price et al. |
| 2003/0106021 A1 | 6/2003 | Mangrola |
| 2003/0123112 A1 | 7/2003 | Kajita et al. |
| 2003/0131110 A1 | 7/2003 | Chang et al. |
| 2003/0140053 A1 | 7/2003 | Vasey |
| 2003/0142351 A1 | 7/2003 | Sakura |
| 2003/0164987 A1 | 9/2003 | Enomoto et al. |
| 2003/0167336 A1 | 9/2003 | Iwamoto et al. |
| 2003/0174356 A1 | 9/2003 | Cherry et al. |
| 2003/0182632 A1 | 9/2003 | Murdock et al. |
| 2003/0184552 A1 | 10/2003 | Chadha |
| 2003/0184590 A1 | 10/2003 | Will |
| 2003/0184782 A1 | 10/2003 | Perkins |
| 2003/0187922 A1 | 10/2003 | Ohara et al. |
| 2003/0188193 A1 | 10/2003 | Venkataramappa |
| 2003/0188260 A1 | 10/2003 | Jensen et al. |
| 2003/0197883 A1 | 10/2003 | Lay et al. |
| 2003/0212982 A1 | 11/2003 | Brooks et al. |
| 2003/0223766 A1 | 12/2003 | Imai |
| 2003/0225796 A1 | 12/2003 | Matsubara |
| 2003/0225829 A1 | 12/2003 | Pena et al. |
| 2003/0225894 A1 | 12/2003 | Ito |
| 2003/0231196 A1 | 12/2003 | Keohane et al. |
| 2003/0233437 A1 | 12/2003 | Kitada et al. |
| 2004/0003341 A1 | 1/2004 | alSafadi et al. |
| 2004/0008363 A1 | 1/2004 | Suzuki et al. |
| 2004/0012628 A1 | 1/2004 | Kropf et al. |
| 2004/0012644 A1 | 1/2004 | Allen et al. |
| 2004/0019705 A1 | 1/2004 | Ogura |
| 2004/0030693 A1 | 2/2004 | Toda |
| 2004/0034786 A1 | 2/2004 | Okamoto et al. |
| 2004/0034807 A1 | 2/2004 | Rostowfske |
| 2004/0039990 A1 | 2/2004 | Bakar et al. |
| 2004/0044779 A1 | 3/2004 | Lambert |
| 2004/0046789 A1 | 3/2004 | Inanoria |
| 2004/0054573 A1 | 3/2004 | Shah et al. |
| 2004/0061729 A1 | 4/2004 | Green |
| 2004/0064759 A1 | 4/2004 | McGuire et al. |
| 2004/0068693 A1 | 4/2004 | Rawat et al. |
| 2004/0070606 A1 | 4/2004 | Yang et al. |
| 2004/0080511 A1 | 4/2004 | Gilbert |
| 2004/0080771 A1 | 4/2004 | Mihira et al. |
| 2004/0080778 A1 | 4/2004 | Ito et al. |
| 2004/0088155 A1 | 5/2004 | Kerr et al. |
| 2004/0093515 A1 | 5/2004 | Reeves, Jr. |
| 2004/0098165 A1 | 5/2004 | Butikofer |
| 2004/0098316 A1 | 5/2004 | Philippe et al. |
| 2004/0098595 A1 | 5/2004 | Aupperle et al. |
| 2004/0105104 A1 | 6/2004 | Ishikawa et al. |
| 2004/0105122 A1 | 6/2004 | Schaeffer |
| 2004/0109028 A1 | 6/2004 | Stern et al. |
| 2004/0111670 A1 | 6/2004 | Sasakuma et al. |
| 2004/0113941 A1 | 6/2004 | Sliwa et al. |

| | | | | | | |
|---|---|---|---|---|---|---|
| 2004/0117358 A1 | 6/2004 | von Kaenel et al. | | 2005/0257148 A1 | 11/2005 | Goodman et al. |
| 2004/0117784 A1 | 6/2004 | Endoh | | 2005/0262440 A1 | 11/2005 | Stanciu et al. |
| 2004/0122659 A1 | 6/2004 | Hourihane et al. | | 2005/0265744 A1 | 12/2005 | Uruta |
| 2004/0125403 A1 | 7/2004 | Furst et al. | | 2006/0004738 A1 | 1/2006 | Blackwell et al. |
| 2004/0128349 A1 | 7/2004 | Maruyama | | 2006/0007480 A1 | 1/2006 | Yokokura |
| 2004/0130744 A1 | 7/2004 | Wu et al. | | 2006/0010180 A1 | 1/2006 | Kawamura et al. |
| 2004/0130749 A1 | 7/2004 | Aoki | | 2006/0015734 A1 | 1/2006 | Atobe |
| 2004/0133525 A1 | 7/2004 | Singh et al. | | 2006/0028397 A1 | 2/2006 | O'Rourke |
| 2004/0150663 A1 | 8/2004 | Kim | | 2006/0031411 A1 | 2/2006 | Gimson et al. |
| 2004/0158471 A1 | 8/2004 | Davis et al. | | 2006/0038004 A1 | 2/2006 | Rielly et al. |
| 2004/0161257 A1 | 8/2004 | Ishihara | | 2006/0041443 A1 | 2/2006 | Horvath, Jr. |
| 2004/0162076 A1 | 8/2004 | Chowdry et al. | | 2006/0045386 A1 | 3/2006 | Fukuoka et al. |
| 2004/0165209 A1 | 8/2004 | Aoki et al. | | 2006/0056873 A1 | 3/2006 | Kimura |
| 2004/0169881 A1 | 9/2004 | Sato | | 2006/0059434 A1 | 3/2006 | Boss et al. |
| 2004/0179229 A1 | 9/2004 | Laughlin | | 2006/0064647 A1 | 3/2006 | Tapuska et al. |
| 2004/0181747 A1 | 9/2004 | Hull et al. | | 2006/0075251 A1 | 4/2006 | Correl et al. |
| 2004/0187018 A1 | 9/2004 | Owen et al. | | 2006/0077119 A1 | 4/2006 | Zhang et al. |
| 2004/0193678 A1 | 9/2004 | Trufinescu et al. | | 2006/0077411 A1 | 4/2006 | Mathieson et al. |
| 2004/0199538 A1 | 10/2004 | Matsuda et al. | | 2006/0077413 A1 | 4/2006 | Lum et al. |
| 2004/0203358 A1 | 10/2004 | Anderson | | 2006/0077414 A1 | 4/2006 | Lum et al. |
| 2004/0205118 A1 | 10/2004 | Yu | | 2006/0077423 A1 | 4/2006 | Mathieson et al. |
| 2004/0205533 A1 | 10/2004 | Lopata et al. | | 2006/0077426 A1 | 4/2006 | Lovat et al. |
| 2004/0205620 A1 | 10/2004 | Nishikiori et al. | | 2006/0077427 A1 | 4/2006 | Zhang et al. |
| 2004/0212823 A1 | 10/2004 | Chavers et al. | | 2006/0077428 A1 | 4/2006 | Lovat et al. |
| 2004/0215671 A1 | 10/2004 | Hyakutake et al. | | 2006/0077429 A1 | 4/2006 | Zhang et al. |
| 2004/0221231 A1 | 11/2004 | Madril et al. | | 2006/0077430 A1 | 4/2006 | Zhang et al. |
| 2004/0223778 A1 | 11/2004 | Zwiefelhofer | | 2006/0077431 A1 | 4/2006 | Zhang et al. |
| 2004/0226993 A1 | 11/2004 | Fulcher et al. | | 2006/0077432 A1 | 4/2006 | Lovat et al. |
| 2004/0227968 A1 | 11/2004 | Nakamura et al. | | 2006/0077433 A1 | 4/2006 | Zhang et al. |
| 2004/0230500 A1 | 11/2004 | Imago | | 2006/0077434 A1 | 4/2006 | Zhang et al. |
| 2004/0230637 A1 | 11/2004 | Lecoueche et al. | | 2006/0077435 A1 | 4/2006 | Lovat et al. |
| 2004/0236862 A1 | 11/2004 | Ito | | 2006/0077436 A1 | 4/2006 | Zhang et al. |
| 2004/0254955 A1 | 12/2004 | Reese et al. | | 2006/0077437 A1 | 4/2006 | Lovat et al. |
| 2004/0255263 A1 | 12/2004 | Ando | | 2006/0077438 A1 | 4/2006 | Lovat et al. |
| 2004/0261010 A1 | 12/2004 | Matsuishi | | 2006/0077439 A1 | 4/2006 | Yamamura et al. |
| 2004/0268229 A1 | 12/2004 | Paoli et al. | | 2006/0077440 A1 | 4/2006 | Stevens et al. |
| 2004/0268306 A1 | 12/2004 | Cheng et al. | | 2006/0077442 A1 | 4/2006 | Lum et al. |
| 2005/0005094 A1 | 1/2005 | Jamieson et al. | | 2006/0077443 A1 | 4/2006 | Lum et al. |
| 2005/0015472 A1 | 1/2005 | Catania et al. | | 2006/0077444 A1 | 4/2006 | Lum et al. |
| 2005/0015585 A1 | 1/2005 | Kurose | | 2006/0077445 A1 | 4/2006 | Yamamura et al. |
| 2005/0022112 A1 | 1/2005 | Kato | | 2006/0077446 A1 | 4/2006 | Lum et al. |
| 2005/0026593 A1 | 2/2005 | Anderson et al. | | 2006/0077447 A1 | 4/2006 | Sojian et al. |
| 2005/0028086 A1 | 2/2005 | Itavaara et al. | | 2006/0077448 A1 | 4/2006 | Plewnia et al. |
| 2005/0044248 A1 | 2/2005 | Mihira et al. | | 2006/0077449 A1 | 4/2006 | Lum et al. |
| 2005/0055475 A1 | 3/2005 | MacKay et al. | | 2006/0077450 A1 | 4/2006 | Reddy et al. |
| 2005/0057560 A1 | 3/2005 | Bibr et al. | | 2006/0077451 A1 | 4/2006 | Nguyen et al. |
| 2005/0060046 A1 | 3/2005 | Ito et al. | | 2006/0077452 A1 | 4/2006 | Nguyen et al. |
| 2005/0060564 A1 | 3/2005 | Murakami et al. | | 2006/0077453 A1 | 4/2006 | Plewnia et al. |
| 2005/0063010 A1 | 3/2005 | Giannetti | | 2006/0077454 A1 | 4/2006 | Lum et al. |
| 2005/0068581 A1 | 3/2005 | Hull et al. | | 2006/0078345 A1 | 4/2006 | Lovat et al. |
| 2005/0071507 A1 | 3/2005 | Ferlitsch | | 2006/0078346 A1 | 4/2006 | Lovat et al. |
| 2005/0071746 A1 | 3/2005 | Hart et al. | | 2006/0080123 A1 | 4/2006 | Plewnia |
| 2005/0076291 A1 | 4/2005 | Yee et al. | | 2006/0080124 A1 | 4/2006 | Plewnia |
| 2005/0080649 A1 | 4/2005 | Alvarez et al. | | 2006/0080129 A1 | 4/2006 | Reddy et al. |
| 2005/0086584 A1 | 4/2005 | Sampathkumar et al. | | 2006/0080184 A1 | 4/2006 | Zhang et al. |
| 2005/0091087 A1 | 4/2005 | Smith et al. | | 2006/0080185 A1 | 4/2006 | Lovat et al. |
| 2005/0091490 A1 | 4/2005 | Ogura | | 2006/0080731 A1 | 4/2006 | Zhang et al. |
| 2005/0091671 A1 | 4/2005 | Deem et al. | | 2006/0085430 A1 | 4/2006 | Yamamura et al. |
| 2005/0097458 A1 | 5/2005 | Wilson | | 2006/0085835 A1 | 4/2006 | Istvan et al. |
| 2005/0102616 A1 | 5/2005 | Thurston | | 2006/0086788 A1 | 4/2006 | Zhang et al. |
| 2005/0108353 A1 | 5/2005 | Yamamoto | | 2006/0090128 A1 | 4/2006 | Reddy et al. |
| 2005/0114267 A1 | 5/2005 | Miwa et al. | | 2006/0092097 A1 | 5/2006 | Reddy et al. |
| 2005/0114658 A1 | 5/2005 | Dye et al. | | 2006/0095541 A1 | 5/2006 | Sojian et al. |
| 2005/0114766 A1 | 5/2005 | Yamamoto | | 2006/0095542 A1 | 5/2006 | Reddy et al. |
| 2005/0119955 A1 | 6/2005 | Dang et al. | | 2006/0103588 A1 | 5/2006 | Chrisop et al. |
| 2005/0129423 A1 | 6/2005 | Lester et al. | | 2006/0103873 A1 | 5/2006 | Reddy et al. |
| 2005/0131715 A1 | 6/2005 | Trethewey | | 2006/0107197 A1 | 5/2006 | Friend et al. |
| 2005/0138547 A1 | 6/2005 | Muhanna et al. | | 2006/0107212 A1 | 5/2006 | Lovat et al. |
| 2005/0149576 A1 | 7/2005 | Marmaros et al. | | 2006/0107224 A1 | 5/2006 | Friend et al. |
| 2005/0152334 A1 | 7/2005 | Okamoto et al. | | 2006/0112123 A1 | 5/2006 | Clark et al. |
| 2005/0185217 A1 | 8/2005 | Nishizawa et al. | | 2006/0117257 A1 | 6/2006 | Hasson et al. |
| 2005/0195221 A1 | 9/2005 | Berger et al. | | 2006/0119883 A1 | 6/2006 | Lovat et al. |
| 2005/0203747 A1 | 9/2005 | Lecoeuche | | 2006/0154227 A1 | 7/2006 | Rossi et al. |
| 2005/0210399 A1 | 9/2005 | Filner et al. | | 2006/0162076 A1 | 7/2006 | Bartlett et al. |
| 2005/0223413 A1 | 10/2005 | Duggan et al. | | 2006/0165105 A1 | 7/2006 | Shenfield et al. |
| 2005/0231747 A1 | 10/2005 | Bledsoe et al. | | 2006/0168355 A1 | 7/2006 | Shenfield et al. |
| 2005/0231755 A1 | 10/2005 | Araumi et al. | | 2006/0174196 A1 | 8/2006 | Zhang et al. |
| 2005/0246428 A1 | 11/2005 | Araumi | | 2006/0184522 A1 | 8/2006 | McFarland et al. |
| 2005/0257134 A1 | 11/2005 | Goodman et al. | | 2006/0198653 A1 | 9/2006 | Plewnia et al. |

| | | | |
|---|---|---|---|
| 2006/0200748 A1 | 9/2006 | Shenfield | |
| 2006/0200749 A1 | 9/2006 | Shenfield | |
| 2006/0221941 A1 | 10/2006 | Kishinsky et al. | |
| 2006/0224405 A1 | 10/2006 | White et al. | |
| 2006/0235742 A1 | 10/2006 | Castellanos et al. | |
| 2006/0277286 A1 | 12/2006 | Zhang et al. | |
| 2006/0279474 A1 | 12/2006 | Lum et al. | |
| 2006/0279475 A1 | 12/2006 | Lum et al. | |
| 2007/0022180 A1 | 1/2007 | Cocotis et al. | |
| 2007/0041035 A1 | 2/2007 | Sembower et al. | |
| 2007/0061129 A1 | 3/2007 | Barreiro | |
| 2007/0078805 A1 | 4/2007 | Reddy et al. | |
| 2007/0089049 A1 | 4/2007 | Gormish et al. | |
| 2007/0091010 A1 | 4/2007 | Richardson et al. | |
| 2007/0094103 A1 | 4/2007 | Hyakutake et al. | |
| 2007/0146823 A1 | 6/2007 | Borchers et al. | |
| 2007/0147610 A1 | 6/2007 | Kethi Reddy | |
| 2007/0173266 A1 | 7/2007 | Barnes | |
| 2007/0174894 A1 | 7/2007 | Matsunaga | |
| 2007/0186150 A1 | 8/2007 | Rao et al. | |
| 2007/0201654 A1 | 8/2007 | Shenfield | |
| 2007/0201655 A1 | 8/2007 | Shenfield | |
| 2007/0226608 A1 | 9/2007 | Virk et al. | |
| 2007/0233902 A1 | 10/2007 | Trefler et al. | |
| 2007/0283274 A1 | 12/2007 | Mettifogo | |
| 2007/0291293 A1 | 12/2007 | Bellagamba et al. | |
| 2008/0022267 A1 | 1/2008 | Johnson et al. | |
| 2008/0046806 A1 | 2/2008 | Reddy et al. | |
| 2008/0072162 A1 | 3/2008 | Dauerer et al. | |
| 2008/0155396 A1 | 6/2008 | Dubinko et al. | |
| 2008/0162116 A1 | 7/2008 | Briggs et al. | |

FOREIGN PATENT DOCUMENTS

| | | |
|---|---|---|
| JP | 09160441 | 12/1995 |
| JP | 08234945 | 9/1996 |
| JP | 8234945 | 9/1996 |
| JP | 09293036 | 11/1997 |
| JP | 09330190 | 12/1997 |
| JP | 10013695 | 1/1998 |
| JP | 10154190 A | 6/1998 |
| JP | 10240490 | 9/1998 |
| JP | 10269184 | 10/1998 |
| JP | 2000112691 | 4/2000 |
| JP | 2000174949 | 6/2000 |
| JP | 2000207108 | 7/2000 |
| JP | 2002259071 | 2/2001 |
| JP | 2001268296 | 9/2001 |
| JP | 200284383 | 3/2002 |
| JP | 2002140195 | 5/2002 |
| JP | 2002171380 | 6/2002 |
| JP | 2002175195 | 6/2002 |
| JP | 2002221877 | 8/2002 |
| JP | 2002236830 | 8/2002 |
| JP | 2002298049 A | 10/2002 |
| JP | 2002312148 | 10/2002 |
| JP | 2002324049 | 11/2002 |
| JP | 2002330253 | 11/2002 |
| JP | 2002351644 | 12/2002 |
| JP | 2003022258 | 1/2003 |
| JP | 2003050781 | 2/2003 |
| JP | 2003157155 A | 5/2003 |
| JP | 2003178023 | 6/2003 |
| JP | 2003196554 A | 7/2003 |
| JP | 2003198792 | 7/2003 |
| JP | 2003208484 | 7/2003 |
| JP | 2003209644 | 7/2003 |
| JP | 2003216368 | 7/2003 |
| JP | 2003216395 A | 7/2003 |
| JP | 2003223299 | 8/2003 |
| JP | 2003260853 | 9/2003 |
| JP | 2003281227 | 10/2003 |
| JP | 2003288179 | 10/2003 |
| JP | 2003308195 | 10/2003 |
| JP | 200430448 | 1/2004 |
| JP | 2004074530 | 3/2004 |
| JP | 2004088561 | 3/2004 |
| JP | 2004094313 | 3/2004 |
| JP | 2004128561 | 4/2004 |
| JP | 2004118549 | 5/2004 |
| JP | 2004164157 A | 6/2004 |
| JP | 2004185396 | 7/2004 |
| JP | 2004213356 | 7/2004 |
| JP | 2004215309 | 7/2004 |
| JP | 2004222247 | 8/2004 |
| JP | 2004228686 | 8/2004 |
| JP | 2004228687 | 8/2004 |
| JP | 2004240752 | 8/2004 |
| JP | 2004246771 | 9/2004 |
| JP | 2004310326 | 11/2004 |
| JP | 2004310516 | 11/2004 |
| JP | 2004276271 | 12/2004 |
| JP | 2004358800 | 12/2004 |
| JP | 2005014591 | 1/2005 |
| JP | 2005033460 | 2/2005 |
| JP | 2005059496 | 3/2005 |
| JP | 2005070979 | 3/2005 |
| JP | 2005078278 | 3/2005 |
| JP | 2005084891 | 3/2005 |
| JP | 2005115543 | 4/2005 |
| JP | 2005004243 | 6/2005 |
| JP | 2005209059 | 8/2005 |
| JP | 2005219440 A | 8/2005 |
| JP | 2005235034 A | 9/2005 |
| JP | 2005269250 | 9/2005 |
| JP | 2006053905 | 2/2006 |
| JP | 2006140898 | 6/2006 |
| WO | WO0118754 A1 | 3/2001 |
| WO | WO01/33381 | 5/2001 |
| WO | WO0198864 | 12/2001 |

OTHER PUBLICATIONS

U.S. Appl. No. 10/962,248—Final Office Action dated Jun. 10, 2009.
U.S. Appl. No. 10/962,248—Non-Final Office Action dated Jan. 29, 2010.
U.S. Appl. No. 11/232,588—Non-Final Office Action dated Apr. 1, 2009.
U.S. Appl. No. 11/232,588—Final Office Action dated Nov. 27, 2009.
U.S. Appl. No. 10/961,793—Non-Final Office Action dated Jun. 24, 2009.
U.S. Appl. No. 10/961,793—Final Office Action dated Feb. 4, 2010.
U.S. Appl. No. 10/961,911—Non-Final Office Action dated Jun. 8, 2009.
U.S. Appl. No. 10/961,911—Non-Final Office Action dated Feb. 3, 2010.
U.S. Appl. No. 10/962,103—Non-Final Office Action dated Aug. 14, 2009.
U.S. Appl. No. 11/232,827—Final Office Action dated Jun. 4, 2009.
U.S. Appl. No. 11/232,827—Non-Final Office Action dated Dec. 1, 2009.
U.S. Appl. No. 11/073,055—Non-Final Office Action dated Jun. 19, 2009.
U.S. Appl. No. 11/073,055—Final Office Action dated Feb. 18, 2010.
U.S. Appl. No. 11/233,202—Non-Final Office Action dated Jun. 9, 2009.
U.S. Appl. No. 11/233,202—Final Office Action dated Jan. 15, 2010.
U.S. Appl. No. 11/233,201—Final Office Action dated Apr. 28, 2009.
U.S. Appl. No. 11/233,201—Non-Final Office Action dated Sep. 4, 2009.
U.S. Appl. No. 11/232,552—Final Office Action dated Jun. 24, 2009.
U.S. Appl. No. 11/232,552—Non-Final Office Action dated Dec. 24, 2009.
U.S. Appl. No. 11/233,270—Final Office Action dated Mar. 31, 2009.
U.S. Appl. No. 11/233,270—Final Office Action dated Nov. 27, 2009.
U.S. Appl. No. 11/465,699—Non-Final Office Action dated Sep. 17, 2008.
U.S. Appl. No. 11/465,699—Final Office Action dated Mar. 31, 2009.
U.S. Appl. No. 11/465,699—Final Office Action dated Nov. 27, 2009.
U.S. Appl. No. 11/465,722—Non-Final Office Action dated Dec. 24, 2009.

U.S. Appl. No. 11/241,501—Final Office Action dated May 13, 2009.
U.S. Appl. No. 11/241,501—Non-Final Office Action dated Feb. 9, 2010.
U.S. Appl. No. 11/241,497—Non-Final Office Action dated Oct. 6, 2009.
U.S. Appl. No. 11/241,011—Final Office Action dated Apr. 2, 2009.
U.S. Appl. No. 11/241,011—Non-Final Office Action dated Jan. 4, 2010.
U.S. Appl. No. 11/241,010—Final Office Action dated Mar. 20, 2009.
U.S. Appl. No. 11/241,071—Non-Final Office Action dated Aug. 19, 2009.
U.S. Appl. No. 11/241,447—Non-Final Office Action dated Jul. 22, 2009.
U.S. Appl. No. 11/241,498—Non-Final Office Action dated Dec. 10, 2009.
U.S. Appl. No. 11/240,039—Final Office Action dated Apr. 13, 2009.
U.S. Appl. No. 11/240,039—Non-Final Office Action dated Nov. 3, 2009.
U.S. Appl. No. 11/240,156—Non-Final Office Action dated Sep. 16, 2009.
U.S. Appl. No. 11/255,611—Notice of Allowance dated Aug. 10, 2009.
U.S. Appl. No. 11/256,479—Final Office Action dated Apr. 1, 2009.
U.S. Appl. No. 11/256,479—Non-Final Office Action dated Nov. 16, 2009.
U.S. Appl. No. 11/192,617—Non-Final Office Action dated Sep. 29, 2009.
U.S. Appl. No. 11/193,154—Non-Final Office Action dated Jun. 3, 2009.
U.S. Appl. No. 11/193,154—Final Office Action dated Dec. 7, 2009.
U.S. Appl. No. 11/192,630—Final Office Action dated Sep. 2, 2009.
U.S. Appl. No. 11/192,546—Final Office Action dated Jun. 30, 2009.
U.S. Appl. No. 11/192,546—Non-Final Office Action dated Nov. 24, 2009.
U.S. Appl. No. 11/193,077—Notice of Allowance dated Mar. 11, 2008.
U.S. Appl. No. 11/192,870—Non-Final Office Action dated Jul. 17, 2009.
U.S. Appl. No. 11/192,870—Final Office Action dated Jan. 4, 2010.
U.S. Appl. No. 11/192,865—Non-Final Office Action dated Aug. 20, 2009.
U.S. Appl. No. 11/192,836—Notice of Allowance dated Dec. 30, 2008.
U.S. Appl. No. 11/192,616—Non-Final Office Action dated Sep. 17, 2009.
U.S. Appl. No. 11/193,147—Notice of Allowance dated Dec. 30, 2008.
U.S. Appl. No. 11/192,868—Final Office Action dated Aug. 11, 2009.
U.S. Appl. No. 11/192,629—Final Office Action dated Jun. 26, 2009.
U.S. Appl. No. 11/192,629—Non-Final Office Action dated Jan. 15, 2010.
U.S. Appl. No. 11/193,151—Final Office Action dated Sep. 21, 2009.
U.S. Appl. No. 11/193,188—Final Office Action dated Aug. 5, 2009.
U.S. Appl. No. 11/192,824—Non-Final Office Action dated Sep. 18, 2009.
U.S. Appl. No. 11/193,140—Final Office Action dated May 18, 2009.
U.S. Appl. No. 11/193,140—Notice of Allowance dated Jan. 29, 2010.
U.S. Appl. No. 11/192,796—Non-Final Office Action dated Dec. 28, 2009.
U.S. Appl. No. 11/192,615—Non-Final Office Action dated Sep. 4, 2009.
U.S. Appl. No. 11/192,547—Final Office Action dated Jan. 15, 2010.
U.S. Appl. No. 11/192,467—Non-Final Office Action dated Nov. 13, 2009.
U.S. Appl. No. 11/255,333—Notice of Allowance dated Nov. 3, 2009.
U.S. Appl. No. 11/465,747—Non-Final Office Action dated Jun. 24, 2009.
U.S. Appl. No. 11/465,752—Non-Final Office Action dated Jun. 24, 2009.
U.S. Appl. No. 11/241,320—Non-Final Office Action dated Oct. 7, 2009.
U.S. Appl. No. 11/240,139—Non-Final Office Action dated Oct. 6, 2009.
U.S. Appl. No. 11/240,084—Final Office Action dated Apr. 15, 2009.
U.S. Appl. No. 11/240,084—Non-Final Office Action dated Dec. 16, 2009.
U.S. Appl. No. 11/218,033—Final Office Action dated Mar. 30, 2009.
U.S. Appl. No. 11/218,033—Non-Final Office Action dated Sep. 8, 2009.
U.S. Appl. No. 11/218,186—Non-Final Office Action dated Jun. 23, 2009.
U.S. Appl. No. 11/218,186—Final Office Action dated Feb. 1, 2010.
U.S. Appl. No. 11/562,342—Non-Final Office Action dated May 29, 2009.
U.S. Appl. No. 11/562,342—Final Office Action dated Dec. 21, 2009.
U.S. Appl. No. 11/685,046—Non-Final Office Action dated Jul. 8, 2009.
U.S. Appl. No. 11/685,046—Final Office Action dated Dec. 21, 2009.
JP Patent App. No. 2006-261563—Office Action filed for a related foreign application dated Jan. 19, 2010.
JP Patent App. No. 2006-207199—Office Action filed for a related foreign application dated Feb. 2, 2010.
JP Patent App. No. 2006-058600—Office Action filed for a related foreign application dated Aug. 18, 2009.
JP Patent App. No. 2005-295772—Office Action filed for a related foreign application dated Sep. 15, 2009.
JP Patent App. No. 2005-295772—Notice of Allowance filed for a related foreign application dated Dec. 15, 2009.
JP Patent App. No. 2006-207200—Office Action filed for a related foreign application dated Feb. 2, 2010.
JP Patent App. No. 2006-207194—Office Action filed for a related foreign application dated Jan. 12, 2010.
JP Patent App. No. 2006-261564—Office Action filed for a related foreign application dated Jan. 19, 2010.
JP Patent App. No. 2006-207199—Office Action filed for a related foreign application dated Nov. 17, 2009.
JP Patent App. No. 2007-225913—Office Action filed for a related foreign application dated Dec. 24, 2009.
JP Patent App. No. 2006-256442—Office Action filed for a related foreign application dated Jul. 14, 2009.
JP Patent App. No. 2006-207194—Office Action filed for a related foreign application dated Jun. 23, 2009.
U.S. Appl. No. 10/961,911—Office Action dated Apr. 16, 2008.
U.S. Appl. No. 10/961,594—Office Action dated Jan. 7, 2008.
U.S. Appl. No. 11/193,077—Office Action dated Apr. 6, 2007.
U.S. Appl. No. 11/192,836—Office Action dated Dec. 5, 2007.
U.S. Appl. No. 11/192,836—Office Action dated Jul. 3, 2007.
U.S. Appl. No. 11/192,836—Office Action dated Jan. 30, 2007.
U.S. Appl. No. 11/193,147—Office Action dated Dec. 6, 2007.
U.S. Appl. No. 11/193,147—Office Action dated Jul. 23, 2007.
U.S. Appl. No. 11/193,147—Office Action dated Feb. 9, 2007.
Canon USA, Inc.; MEAP Multifunctional Embedded Application Platform; Aug. 2004; http://developersupport.canon.com/MEAP.htm.
Canon USA, Inc.; MEAP; FAQ; accessed on Jul. 2004, pub. date unknown; http://developersupport.canon.com/MEAP.htm.
Xerox, Inc.; Xerox FreeFlow digital workflow collection; 2003; http://www.xerox.com/downloads/usa/en/s/solutions_digital_workflow_whitepaper_sdk.pdf.
Ricoh Company, Ltd.; Ricoh's Medium-Term Management Plan; Mar. 19, 2002; http://www.ricoh.com/IR/data/pre/pdf/ir_pre2002.pdf.
Ricoh Company, Ltd.; White Paper; Embedded Software Architecture SDK; Jun. 25, 2003 http://www.ricoh-usa.com/products/concept/esa.asp?catname=ESA.
Hewlett-Packard Company; JetCAPS Scan2Folder; 2003; http://www.jetcaps.se/resources/datasheets/ds_scan2folder.pdf.

Hewlett-Packard Company; JetCAPS chai applications; Dec. 9, 2002; http://www.stethos.com/chai/data/d_us_chai.pdf.

F.D. Wright, Design Goals for an Internet Printing Protocol, Apr. 1999, pp. 1-43, http://tools.ietf.org/html/rfc2567.

R. Herriot, Internet Printing Protocol (IPP): Event Notifications and Subscriptions (Feb. 21, 2003, retrieved from http://tools.ietf.org/html/draft-ietf-ipp-not-spec-11 on Aug. 20, 2008, pp. 1-101).

T. Hastings, "Internet Printing Protocol/1.1: Model and Semantics" (Sep. 2000, retrieved from http://www.ietf.org/rfc/rfc291.txt on Sep. 18, 2008, pp. 1-210).

R. Herriot, Internet Printing Protocol (IPP): Event Notifications and Subscriptions, Jun. 21, 2004, http://tools.ietf.org/html/draft-ietf-ipp-not-spec-12, pp. 1-98.

Microsoft Corporation. Microsoft Computer Dictionary, Fifth Edition, 2002 Microsoft Press, pp. 487-488.

Gaedke, Martin et al. "A Modeling Approach to Federated Identity and Access Management", May 2005 ACM.

FOLDOC. "relational database", Jun. 2002, retrieved from <http://foldoc.org/index.cgi?query=relational+database>.

OASIS. "Security Assertion Markup Language (SAML) 2.0 Technical Overview", Working Draft 01, Jul. 22, 2004, <http://www.oasis-open.org/committees/documents.php?wg_abbrev=security>.

Hartman, Bret et al. Mastering Web Services Security, 2003 Wiley Publishing, Inc., pp. 36-46.

U.S. Appl. No. 10/962,248—Office Action dated Aug. 19, 2008.
U.S. Appl. No. 10/961,793—Office Action dated Jun. 20, 2008.
U.S. Appl. No. 10/961,793—Office Action dated Dec. 19, 2008.
U.S. Appl. No. 10/961,911—Office Action dated Oct. 28, 2008.
U.S. Appl. No. 10/961,594—Office Action dated Dec. 3, 2008.
U.S. Appl. No. 10/961,594—Office Action dated Mar. 16, 2009.
U.S. Appl. No. 10/962,103—Office Action dated Jul. 9, 2008.
U.S. Appl. No. 10/962,103—Office Action dated Jan. 23, 2009.
U.S. Appl. No. 11/232,827—Office Action dated Dec. 5, 2008.
U.S. Appl. No. 11/073,055—Office Action dated Sep. 18, 2008.
U.S. Appl. No. 11/073,055—Office Action dated Mar. 4, 2009.
U.S. Appl. No. 11/233,202—Office Action dated Jun. 5, 2008.
U.S. Appl. No. 11/233,202—Office Action dated Dec. 1, 2008.
U.S. Appl. No. 11/233,201—Office Action dated Oct. 3, 2008.
U.S. Appl. No. 11/232,552—Office Action dated Nov. 18, 2008.
U.S. Appl. No. 11/233,270—Office Action dated Sep. 17, 2008.
U.S. Appl. No. 11/241,501—Office Action dated Oct. 23, 2008.
U.S. Appl. No. 11/241,497—Office Action dated Feb. 20, 2009.
U.S. Appl. No. 11/241,497—Office Action dated Aug. 27, 2008.
U.S. Appl. No. 11/241,011—Office Action dated Oct. 8, 2008.
U.S. Appl. No. 11/241,010—Office Action dated Oct. 9, 2008.
U.S. Appl. No. 11/241,071—Office Action dated Mar. 3, 2009.
U.S. Appl. No. 11/241,071—Office Action dated Sep. 19, 2008.
U.S. Appl. No. 11/241,447—Office Action dated Mar. 5, 2009.
U.S. Appl. No. 11/241,447—Office Action dated Sep. 15, 2008.
U.S. Appl. No. 11/241,498—Office Action dated Sep. 16, 2008.
U.S. Appl. No. 11/241,498—Office Action dated Mar. 5, 2009.
U.S. Appl. No. 11/240,039—Office Action dated Oct. 20, 2008.
U.S. Appl. No. 11/240,156—Office Action dated Aug. 28, 2008.
U.S. Appl. No. 11/240,156—Office Action dated Feb. 20, 2009.
U.S. Appl. No. 11/255,611—Office Action dated Mar. 12, 2009.
U.S. Appl. No. 11/256,479—Office Action dated Nov. 4, 2008.
U.S. Appl. No. 11/255,333—Office Action dated Mar. 13, 2009.
U.S. Appl. No. 11/193,154—Office Action dated Dec. 2, 2008.
U.S. Appl. No. 11/192,630—Office Action dated Jan. 21, 2009.
U.S. Appl. No. 11/192,546—Office Action dated Jan. 22, 2009.
U.S. Appl. No. 11/192,836—Office Action dated Jul. 9, 2008.
U.S. Appl. No. 11/193,147—Office Action dated Jul. 9, 2008.
U.S. Appl. No. 11/192,868—Office Action dated Feb. 2, 2009.
U.S. Appl. No. 11/192,629—Office Action dated Jan. 22, 2009.
U.S. Appl. No. 11/193,151—Office Action dated Feb. 23, 2009.
U.S. Appl. No. 11/193,188—Office Action dated Jan. 21, 2009.
U.S. Appl. No. 11/193,140—Office Action dated Nov. 18, 2008.
U.S. Appl. No. 11/192,796—Office Action dated Feb. 24, 2009.
U.S. Appl. No. 11/192,547—Office Action dated Feb. 5, 2009.
U.S. Appl. No. 11/240,084—Office Action dated Oct. 30, 2008.
U.S. Appl. No. 11/218,033—Office Action dated Sep. 12, 2008.

Foreign Patent App. No. JP2006-058600—Office Action filed for a related foreign application dated Aug. 18, 2009 corresponding to U.S. Appl. No. 11/073,055.
Foreign Patent App. No. JP2006-207200—Office Action filed for a related foreign application dated Jun. 1, 2010 corresponding to U.S. Appl. No. 11/192,547.
Foreign Patent App. No. JP2006-207196—Office Action filed for a related foreign application dated Mar. 2, 2010 corresponding to U.S. Appl. No. 11/192,862.
Foreign Patent App. No. JP2006-256441—Office Action filed for a related foreign application dated Mar. 30, 2010 corresponding to U.S. Appl. No. 11/233,202.
Foreign Patent App. No. JP2006-207198—Office Action filed for a related foreign application dated Mar. 2, 2010 corresponding to U.S. Appl. No. 11/192,616.
U.S. Appl. No. 10/961,594—Final Office Action dated Apr. 2, 2010.
U.S. Appl. No. 10/962,103—Non-final Office Action dated May 14, 2010.
U.S. Appl. No. 11/232,827—Final Office Action dated Jun. 14, 2010.
U.S. Appl. No. 11/233,201—Final Office Action dated Jun. 3, 2010.
U.S. Appl. No. 11/232,588—Notice of Allowance dated Jun. 23, 2010.
U.S. Appl. No. 11/233,270—Non-final Office Action dated Jun. 9, 2010.
U.S. Appl. No. 11/465,699—Non-final Office Action dated Nov. 16, 2009.
U.S. Appl. No. 11/465,699—Final Office Action dated May 24, 2010.
U.S. Appl. No. 11/465,722—Final Office Action dated Apr. 30, 2010.
U.S. Appl. No. 11/241,011—Final Office Action dated Jun. 29, 2010.
U.S. Appl. No. 11/241,010—Non-final Office Action dated Apr. 15, 2010.
U.S. Appl. No. 11/241,071—Final Office Action dated Apr. 16, 2010.
U.S. Appl. No. 11/241,447—Final Office Action dated Apr. 1, 2010.
U.S. Appl. No. 11/240,039—Notice of Allowance dated Jun. 3, 2010.
U.S. Appl. No. 11/240,156—Final Office Action dated Mar. 31, 2010.
U.S. Appl. No. 11/256,479—Final Office Action dated May 13, 2010.
U.S. Appl. No. 11/192,617—Final Office Action dated Jun. 11, 2010.
U.S. Appl. No. 11/193,076—Non-final Office Action dated Apr. 5, 2010.
U.S. Appl. No. 11/192,630—Non-final Office Action dated Apr. 9, 2010.
U.S. Appl. No. 11/192,546—Final Office Action dated Jul. 14, 2010.
U.S. Appl. No. 11/192,937—First Action Interview Pilot Program Pre-Interview Communication dated Apr. 7, 2010.
U.S. Appl. No. 11/192,616—Final Office Action dated May 26, 2010.
U.S. Appl. No. 11/192,500—Non-final Office Action dated Jul. 21, 2010.
U.S. Appl. No. 11/192,868—Non-final Office Action dated May 19, 2010.
U.S. Appl. No. 11/193,188—Non-final Office Action dated Apr. 19, 2010.
U.S. Appl. No. 11/192,824—Non-final Office Action dated Mar. 1, 2010.
U.S. Appl. No. 11/192,615—Final Office Action dated Apr. 20, 2010.
U.S. Appl. No. 11/192,547—Non-final Office Action dated Jun. 25, 2010.
U.S. Appl. No. 11/192,467—Final Office Action dated Jun. 25, 2010.
U.S. Appl. No. 11/256,493—Non-final Office Action dated Mar. 9, 2010.
U.S. Appl. No. 11/465,752—Final Office Action dated Apr. 2, 2010.
U.S. Appl. No. 11/241,320—Final Office Action dated Jun. 17, 2010.
U.S. Appl. No. 11/240,139—Final Office Action dated Jun. 9, 2010.
U.S. Appl. No. 11/218,033—Final Office Action dated May 14, 2010.
Foreign Patent App. No. JP2006205150—Office Action filed for a related foreign application dated Sep. 28, 2010 corresponding to U.S. Appl. No. 11/192,500.

Foreign Patent App. No. JP2006207198—Office Action filed for a related foreign application dated Sep. 21, 2010 corresponding to U.S. Appl. No. 11/192,836.
Foreign Patent App. No. JP2006256441—Office Action filed for a related foreign application dated Nov. 9, 2010 corresponding to U.S. Appl. No. 11/233,202.
Foreign Patent App. No. JP2006256440—Office Action filed for a related foreign application dated Oct. 19, 2010 corresponding to U.S. Appl. No. 11/233,270.
U.S. Appl. No. 10/961,793—Non-Final Office Action dated Oct. 28, 2010.
U.S. Appl. No. 10/961,911—Final Office Action dated Oct. 20, 2010.
U.S. Appl. No. 11/073,055—Non-Final Office Action dated Nov. 23, 2010.
U.S. Appl. No. 11/233,270—Notice of Allowance dated Nov. 30, 2010.
U.S. Appl. No. 11/241,010—Final Office Action dated Oct. 15, 2010.
U.S. Appl. No. 11/240,156—Non-Final Office Action dated Nov. 10, 2010.
U.S. Appl. No. 11/256,479—Non-Final Office Action dated Nov. 23, 2010.
U.S. Appl. No. 11/193,152—Non-Final Office Action dated Mar. 1, 2010.
U.S. Appl. No. 11/193,152—Final Office Action dated Nov. 18, 2010.
U.S. Appl. No. 11/193,151—Non-Final Office Action dated Mar. 29, 2010.
U.S. Appl. No. 11/193,151—Final Office Action dated Nov. 2, 2010.
U.S. Appl. No. 11/192,824—Final Office Action dated Oct. 22, 2010.
U.S. Appl. No. 11/465,747—Final Office Action dated Mar. 9, 2010.
U.S. Appl. No. 11/241,447—Non-Final Office Action dated Dec. 8, 2010.
U.S. Appl. No. 11/193,076—Final Office Action dated Jan. 6, 2011.
U.S. Appl. No. 11/192,630—Final Office Action dated Dec. 8, 2010.
U.S. Appl. No. 11/192,868—Final Office Action dated Dec. 8, 2010.
U.S. Appl. No. 11/193,188—Final Office Action dated Dec. 8, 2010.
U.S. Appl. No. 11/192,615—Non-Final Office Action dated Jan. 4, 2011.
U.S. Appl. No. 11/192,467—Notice of Allowance dated Dec. 22, 2010.
U.S. Appl. No. 11/465,747—Notice of Allowance dated Dec. 28, 2010.
E. Uemukai Toshiaki, A WWW Browsing System in Remote Display Environments, IPSJ magazine, Information Processing Society of Japan, Publication Date: Sep. 15, 2000, vol. 41, No. 9, p. 2364 to 2373.
Foreign Patent App. No. JP2006256440—Office Action filed for a related foreign application dated Jun. 7, 2010 corresponding to U.S. Appl. No. 11/233,270.
Foreign Patent App. No. JP2006261564—Office Action filed for a related foreign application dated Jun. 15, 2010 corresponding to U.S. Appl. No. 11/241,010.
Foreign Patent App. No. JP2006207195—Office Action filed for a related foreign application dated Jul. 27, 2010 corresponding to U.S. Appl. No. 11/192,617.
U.S. Appl. No. 10/962,248—Final Office Action dated Aug. 17, 2010.
U.S. Appl. No. 10/961,594—Non-Final Office Action dated Sep. 15, 2010.
U.S. Appl. No. 11/233,202—Non-Final Office Action dated Jul. 27, 2010.
U.S. Appl. No. 11/233,201—Non-Final Office Action dated Sep. 15, 2010.
U.S. Appl. No. 11/232,552—Final Office Action dated Aug. 19, 2010.
U.S. Appl. No. 11/241,501—Final Office Action dated Jul. 22, 2010.
U.S. Appl. No. 11/241,497—Notice of Allowance dated Aug. 11, 2010.
U.S. Appl. No. 11/241,498—Final Office Action dated Jul. 22, 2010.
U.S. Appl. No. 11/192,862—Non-Final Office Action dated Jul. 26, 2010.
U.S. Appl. No. 11/192,937—Notice of Allowance dated Sep. 7, 2010.
U.S. Appl. No. 11/192,865—Final Office Action dated Mar. 4, 2010.
U.S. Appl. No. 11/192,865—Non-Final Office Action dated Sep. 2, 2010.
U.S. Appl. No. 11/192,629—Final Office Action dated Aug. 25, 2010.
U.S. Appl. No. 11/192,796—Notice of Allowance dated Sep. 10, 2010.
U.S. Appl. No. 11/256,493—Final Office Action dated Aug. 20, 2010.
U.S. Appl. No. 11/240,084—Final Office Action dated Aug. 6, 2010.
Foreign Patent App. No. JP2006261563—Interrogation Report filed for a related foreign application dated Jun. 7, 2011 corresponding to U.S. Appl. No. 11/241,501.
Foreign Patent App. No. JP2006207200—Interrogation Report filed for a related foreign application dated Mar. 8, 2011 corresponding to U.S. Appl. No. 11/192,615.
U.S. Appl. No. 10/961,594—Final Office Action dated May 19, 2011.
U.S. Appl. No. 11/232,827—Non-Final Office Action dated May 26, 2011.
U.S. Appl. No. 11/073,055—Final Office Action dated Mar. 30, 2011.
U.S. Appl. No. 11/233,202—Final Office Action dated Mar. 23, 2011.
U.S. Appl. No. 11/465,699—Non-Final Office Action dated Mar. 23, 2011.
U.S. Appl. No. 11/241,011—Non-Final Office Action dated Feb. 17, 2011.
U.S. Appl. No. 11/192,617—Non-Final Office Action dated Jun. 9, 2011.
U.S. Appl. No. 11/192,546—Non-Final Office Action dated Feb. 17, 2011.
U.S. Appl. No. 11/192,862—Final Office Action dated Mar. 21, 2011.
U.S. Appl. No. 11/192,870—Non-Final Office Action dated Feb. 22, 2011.
U.S. Appl. No. 11/192,616—Non-Final Office Action dated Jun. 9, 2011.
U.S. Appl. No. 11/192,500—Final Office Action dated Mar. 21, 2011.
U.S. Appl. No. 11/193,151—Non-Final Office Action dated Mar. 16, 2011.
U.S. Appl. No. 11/192,824—Non-Final Office Action dated Jun. 9, 2011.
U.S. Appl. No. 11/192,547—Final Office Action dated Mar. 7, 2011.
U.S. Appl. No. 11/465,752—Non-Final Office Action dated Apr. 1, 2011.
U.S. Appl. No. 11/241,320—Non-Final Office Action dated Jun. 9, 2011.
U.S. Appl. No. 11/240,139—Non-Final Office Action dated Jun. 10, 2011.
U.S. Appl. No. 11/240,084—Non-Final Office Action dated May 12, 2011.
U.S. Appl. No. 11/218,033—Non-Final Office Action dated Jun. 9, 2011.
U.S. Appl. No. 11/218,186—Non-Final Office Action dated Jun. 16, 2011.
U.S. Appl. No. 10/962,248—Notice of Allowance dated Apr. 1, 2011.
U.S. Appl. No. 10/961,793—Notice of Allowance dated Jun. 10, 2011.
U.S. Appl. No. 10/962,103—Notice of Allowance dated Feb. 22, 2011.
U.S. Appl. No. 11/233,201—Notice of Allowance dated Jun. 24, 2011.
U.S. Appl. No. 11/241,501—Notice of Allowance dated Feb. 17, 2011.
U.S. Appl. No. 11/241,010—Notice of Allowance dated May 27, 2011.
U.S. Appl. No. 11/241,071—Notice of Allowance dated May 3, 2011.
U.S. Appl. No. 11/241,447—Notice of Allowance dated Jul. 13, 2011.
U.S. Appl. No. 11/241,498—Notice of Allowance dated Apr. 1, 2011.

U.S. Appl. No. 11/240,156—Notice of Allowance dated Jul. 12, 2011.
U.S. Appl. No. 11/256,479—Notice of Allowance dated Jul. 13, 2011.
U.S. Appl. No. 11/192,630—Notice of Allowance dated May 31, 2011.
U.S. Appl. No. 11/192,865—Notice of Allowance dated May 19, 2011.
U.S. Appl. No. 11/192,868—Notice of Allowance dated Apr. 29, 2011.
U.S. Appl. No. 11/193,152—Notice of Allowance dated Apr. 8, 2011.
U.S. Appl. No. 11/192,629—Notice of Allowance dated Apr. 11, 2011.
U.S. Appl. No. 11/192,824—Notice of Allowance dated Apr. 20, 2011.
U.S. Appl. No. 11/256,493—Notice of Allowance dated Apr. 15, 2011.
Foreign Patent App. No. JP2006205159—Japanese Office Action filed for a related foreign application dated Sep. 27, 2011 corresponding to U.S. Appl. No. 11/192,500.
U.S. Appl. No. 11/232,552—Final Office Action dated Aug. 5, 2011.
U.S. Appl. No. 11/465,722—Non-Final Office Action dated Aug. 5, 2011.
U.S. Appl. No. 11/192,862—Non-Final Office Action dated Oct. 13, 2011.
U.S. Appl. No. 11/192,870—Final Office Action dated Aug. 8, 2011.
U.S. Appl. No. 11/192,500—Non-Final Office Action dated Sep. 30, 2011.
U.S. Appl. No. 11/192,615—Final Office Action dated Oct. 11, 2011.
U.S. Appl. No. 11/465,752—Final Office Action dated Oct. 31, 2011.
U.S. Appl. No. 10/961,594—Notice of Allowance dated Oct. 13, 2011.
U.S. Appl. No. 11/465,699—Notice of Allowance dated Sep. 30, 2011.
U.S. Appl. No. 11/241,011—Notice of Allowance dated Sep. 6, 2011.
U.S. Appl. No. 11/192,617—Notice of Allowance dated Oct. 11, 2011.
U.S. Appl. No. 11/193,076—Notice of Allowance dated Oct. 11, 2011.
U.S. Appl. No. 11/192,546—Notice of Allowance dated Aug. 30, 2011.
U.S. Appl. No. 11/192,616—Notice of Allowance dated Oct. 11, 2011.
U.S. Appl. No. 11/193,151—Notice of Allowance dated Aug. 22, 2011.
U.S. Appl. No. 11/241,320—Notice of Allowance dated Oct. 11, 2011.
U.S. Appl. No. 11/240,139—Notice of Allowance dated Oct. 11, 2011.
U.S. Appl. No. 11/240,084—Notice of Allowance dated Oct. 11, 2011.
U.S. Appl. No. 11/218,033—Notice of Allowance dated Oct. 11, 2011.
U.S. Appl. No. 11/218,186—Notice of Allowance dated Oct. 11, 2011.
U.S. Appl. No. 11/232,827—Notice of Allowance dated Dec. 1, 2011.
U.S. Appl. No. 11/073,055—Non-final Office Action dated Feb. 2, 2012.
U.S. Appl. No. 11/232,552—Notice of Allowance dated Jan. 20, 2012.
U.S. Appl. No. 11/465,722—Final Office Action dated Feb. 5, 2011.
U.S. Appl. No. 11/465,752—Notice of Allowance dated Feb. 14, 2012.

* cited by examiner

METHODS AND SYSTEMS FOR THIRD-PARTY CONTROL OF REMOTE IMAGING JOBS

FIELD OF THE INVENTION

Embodiments of the present invention comprise methods and systems for third-party control of remote imaging jobs performed on a peripheral device.

BACKGROUND

Some multi-function peripheral (MFP) devices allow external applications to interact with the on-board functionality of the device. However, these devices limit user interaction to input from the MFP hardware user interface (UI) on the device. These devices do not allow control to be extended to imaging jobs that originate at a remote source (i.e., non-walkup), such as a PC-print or PC-fax.

SUMMARY

Some embodiments of the present invention comprise methods and systems for third-party control of remote imaging jobs performed on a peripheral device.

Some embodiments provide for the programmatic control to a third-party controlling application that is controlling an imaging device. In some embodiments a remote user input device or client may provide a user interface for collecting user input. This user input may be passed to a controlling application that is in control of an imaging device. The controlling application may then act on the input received from the user input device to control the imaging device according to the input.

The foregoing and other objectives, features, and advantages of the invention will be more readily understood upon consideration of the following detailed description of the invention taken in conjunction with the accompanying drawings.

BRIEF DESCRIPTION OF THE SEVERAL DRAWINGS

DETAILED DESCRIPTION OF EXEMPLARY EMBODIMENTS

Embodiments of the present invention will be best understood by reference to the drawings, wherein like parts are designated by like numerals throughout. The figures listed above are expressly incorporated as part of this detailed description.

It will be readily understood that the components of the present invention, as generally described and illustrated in the figures herein, could be arranged and designed in a wide variety of different configurations. Thus, the following more detailed description of the embodiments of the methods and systems of the present invention is not intended to limit the scope of the invention but it is merely representative of the presently preferred embodiments of the invention.

Elements of embodiments of the present invention may be embodied in hardware, firmware and/or software. While exemplary embodiments revealed herein may only describe one of these forms, it is to be understood that one skilled in the art would be able to effectuate these elements in any of these forms while resting within the scope of the present invention.

Some embodiments of the present invention comprise methods and systems for allowing imaging jobs that originate at a remote user device (RUD) to be programmatically controlled from a 3rd party application running on a remote computing device (RCD) wherein the $3^{rd}$ party application is controlling an imaging device (IDev), such as a multi-function peripheral device (IDev 2). Examples of remote jobs that originate on an RUD comprise: PC-print, PC-fax, PC-file and others.

Figure 1:
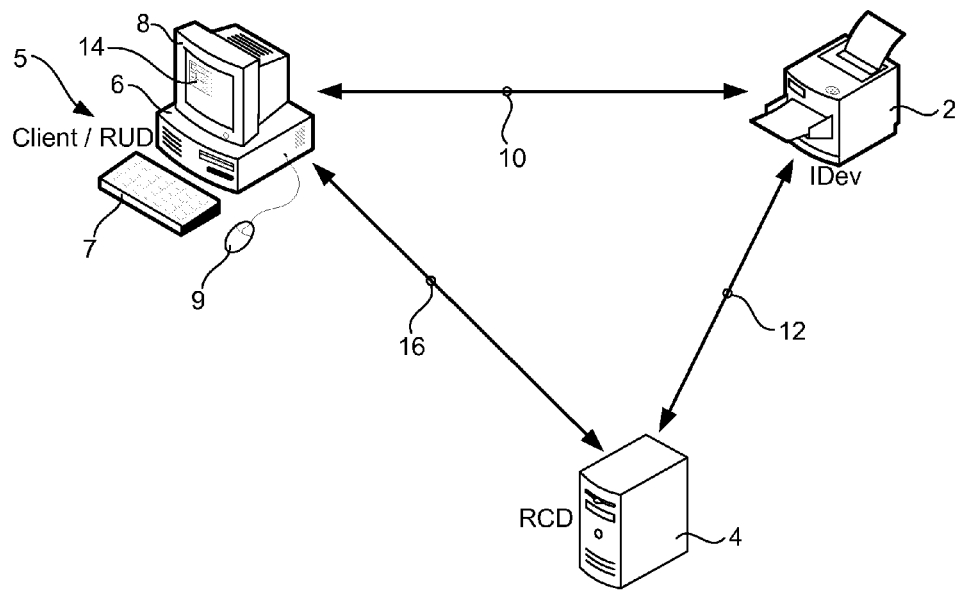
FIG. 1 is a diagram depicting exemplary devices and communication links of exemplary embodiments of the present invention.

Some embodiments of the present invention may be described with reference to FIG. 1. These embodiments may comprise an imaging device 2 such as a multi-function peripheral device (IDev 2) that may perform multiple imaging functions such a copying, faxing, printing, scanning, filing, publishing, format conversion, displaying and other functions. An imaging device may also be a single function device. These embodiments may also comprise a remote computing device (RCD) 4 such as a server, PC or another computing device. An RCD 4 may comprise a processor, memory, storage devices, communication interfaces and other elements. The RCD 4 may communicate with other devices through a communication link, such as communication links 12 and 16. In some embodiments, the RCD 4 may only comprise a single communication link, in other embodiments, the RCD 4 may comprise multiple communication links 12, 16. Communication links 12, 16 and 10 may be wired or wireless communication links that employ standard communication protocols for networks, serial communication, parallel communication and other methods that accomplish bi-directional communication.

These embodiments may also comprise a remote user device (RUD) 5, such as a client personal computer (PC), workstation or another computing device with a user interface (UI) and display. A RUD 5, will typically comprise a central processing unit (CPU) 6, a display 8 and a user interface, such as a keyboard 7 and/or mouse 9. A RUD 5 may also comprise an imaging device driver that runs in conjunction with an operating system on the CPU 6.

In some embodiments data may be transmitted between an RCD 4 and an IDev 2 directly through communication link 12 or indirectly through RUD 5 via communication links 10 and 16. In some embodiments data may be transmitted between an RCD 4 and a RUD 5 directly through communication link 16 or indirectly through IDev 2 via communication links 10 and 12. In some embodiments data may be transmitted from an RUD 5 and an IDev 2 directly through communication link 10 or indirectly through RCD 4 via communication links 12 and 16.

In some embodiments of the present invention, an RCD 4 may take control of an IDev 2 function and allow user control of that function. This may be performed by sending UI content to a UI accessible to a user. In some embodiments, the IDev 2 may receive and display content from the RCD 4 and accept user input in response to the display of that content. In some embodiments, the RCD 4 may send UI content to an RUD 5 for display on the RUD display 8. User input received in response to the display of the UI content 14 on the RUD display 8 may be passed back to the RCD 4, either directly over communication link 16 or through the IDev 2 via communication links 10 and 12.

In some embodiments of the present invention, an exemplary operating environment may comprise an imaging device, such as an IDev 2, whose imaging jobs can be programmatically controlled by an external ($3^{rd}$ party) application running on an RCD 4. In these embodiments, the external controlling application may be registered with the IDev 2. Once registered, the controlling application takes control of the walkup access to the device by taking control of the IDev 2 user interface (UI) (e.g., front panel touch screen UI). In some embodiments, the controlling application may send a UI description to the IDev 2 and the IDev 2 may replace its native UI display with the UI description (e.g., display content) from the controlling application/RCD 4. When a walkup user enters input to the IDev UI, which is displaying the controlling application's UI display content, the IDev 2 may send the input responses to the controlling application on the RCD 4. The controlling application/RCD 4 may then interpret the input responses and, when appropriate, send commands back to the IDev 2 to effectuate functions indicated by the user's input.

In embodiments of the present invention, a controlling application on an RCD 4 is able to extend its programmatic control to remote UIs 8, such as those on a RUD 5, which interfaces with the IDev 2 (e.g., print/fax driver). In some embodiments, the controlling application/RCD 4 is able to register a remote UI interface 14 with the IDev 2, in a way that is comparable to registering a native UI interface. On the RUD 5/client PC side, the print/fax driver may be a generic driver with a programmatic control interface. In some exemplary embodiments, when the print/fax driver, at the RUD 5, is initiated, the driver may orchestrate the following process:
1. Establish a bi-directional communication with the IDev.
2. The IDev may forward a remote UI description registered by the controlling application/RCD to the print/fax driver on the RUD.
3. The driver/RUD renders the UI as the print/fax settings UI and displays it to a user.
4. The driver/RUD sends the UI responses back to the IDev, which forwards them to the controlling application/RCD.
5. The controlling application/RCD interprets the responses and sends back to the IDev the corresponding actions for the device and/or driver.

The generation of the print data by the print/fax driver may comprise one of the following methods:
1. The driver/RUD waits for the controlling application/RCD to send driver actions. Based on these actions, the driver generates a completed print job.
2. The driver/RUD sends the print data as logical pages (i.e., no sheet assembly, outputting instructions, etc) only when it sends the UI responses to the IDev. The IDev stores the logical pages and waits for the controlling application/RCD to send device actions. Based on these actions, the IDev renders/outputs the logical pages.

The printer/fax driver may be an application/process which converts document data in one format (e.g., MS-Word) into printer ready data (e.g., PCL) and optionally perform (i.e., print emulation) some of the print instructions specified at the UI. In other cases, the printer/driver may be an application which directly manipulates the document data in its original format (i.e., direct print, web browser, etc.) and optionally perform (i.e., print emulation) some of the print instructions specified at the UI.

1. Exemplary Operating Environment

Figure 2:
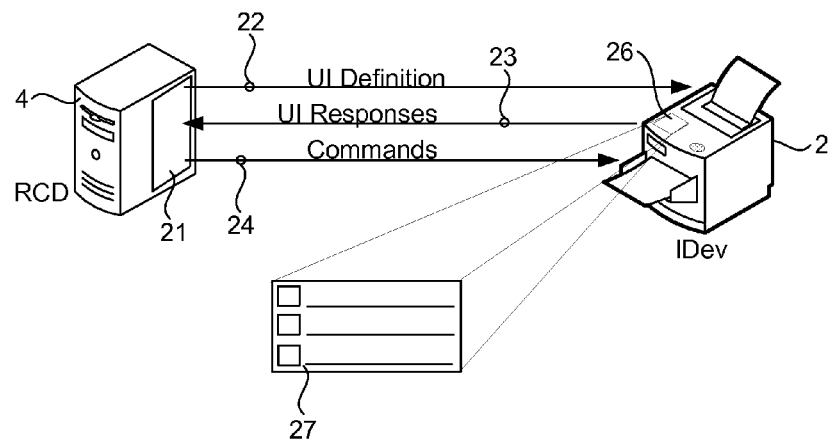
FIG. 2 is a diagram showing exemplary communication between an RCD and an IDev.

In some embodiments, illustrated with reference to FIG. 2, an exemplary operating environment comprises a network- or locally-connected multi-functional peripheral device (IDev) 2 with both walkup and remote job input capabilities. Examples of walkup jobs comprise:
1. Copy
2. Network Scan
3. Hardcopy Fax Out
4. Scan to Storage (e.g., Filing)

Examples of remote input jobs comprise:
1. Print
2. Scan (e.g., twain driver)
3. PC-Fax
4. Filing
5. Format Conversion
6. Remote Copy
7. Publish to Web In some embodiments, the IDev 2 may comprise a touch screen UI that can be programmatically controlled by an external ($3^{rd}$ party) controlling application 21, such as may be found on an RCD 4. In some embodiments, the controlling application 21 may be registered on the IDev 2, such as by manual input, programmatic subscription or discovery.

In this mode, the controlling application 21 may send a UI definition 22 to the IDev2, which the IDev 2 may render as the touch screen 26 UI interface 27 for walkup jobs. When the user enters input to the controlling application's touch screen UI 27, displayed at the IDev 2, the UI input responses may be sent back 23 to the controlling application 21/RCD 4. The controlling application 21/RCD 4 may then interpret the responses and send commands 24, corresponding to the input responses, to the IDev 2 to perform.

The controlling application's bi-directional communication connection 12 with the IDev 2 may be accomplished via many communication transport methods. Exemplary methods comprise:
1. TCP/IP
2. Apple Talk
3. IEEE 1284 Parallel Port
4. IrDA 5. Bluetooth, WiFi, other wireless protocols.
6. Local port: parallel, serial, USB.

Figure 3:
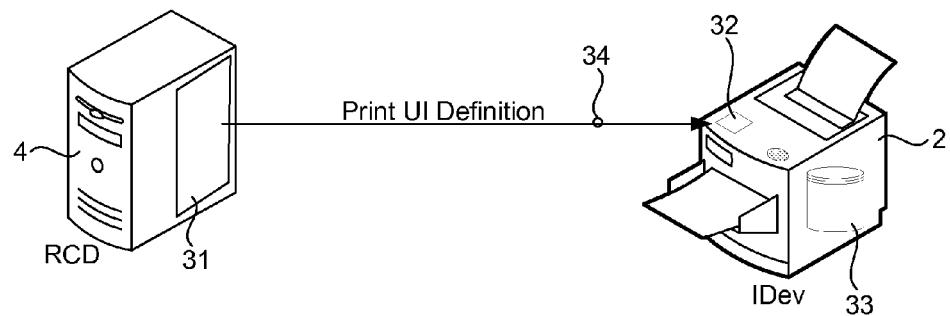
FIG. 3 is a diagram showing transmission of a UI definition from an RCD to an IDev.

2. Controlling Application Registration—Exemplary Embodiment 1—Remote UI Downloaded to IDev In some embodiments of the present invention, described with reference to FIG. 3, a controlling application 31, running on an RCD 4, may be registered with the IDev 2. This registration process may occur by many methods. Exemplary methods comprise:

1. Manual input through an administrative interface (e.g., key operator code on front panel or embedded web page).
2. Automatic registration by the controlling application/RCD through a programmatic registration interface on the IDev (e.g., Simple Object Access Protocol (SOAP), HTTP, Proprietary protocol over TCP/IP, etc.)
3. Discovery of the controlling application by the IDev by a service discovery protocol (e.g., Service Location Protocol (SLP), Simple Service Discovery Protocol (SSDP), Salutation, WS-Discovery, Microsoft UPnP, Sun Jini, Bluetooth, etc).

As part of the registration, the controlling application 31/RCD 4 may download 34 the remote UI definition to the IDev 2. The remote UI definition may be in any format suitable for describing a user interface, such as, but not limited to:

1. HTML (Hypertext Markup Language)
2. XML (Extensible Markup Language)
3. XUL (XML-based User Interface Language)—see Mozilla XPToolkit Project
4. Java Applets The IDev 2 may then store the remote UI definition 33 for the registered controlling application 31. An IDev controller 32 may perform IDev file transfer, communication and other functions. Any means of storage may be used, such as, but not limited to:

1. Internal within the device.
2. External to the device, such as on a storage server.
3. Removable storage, such as a USB thumb drive.

Figure 4:
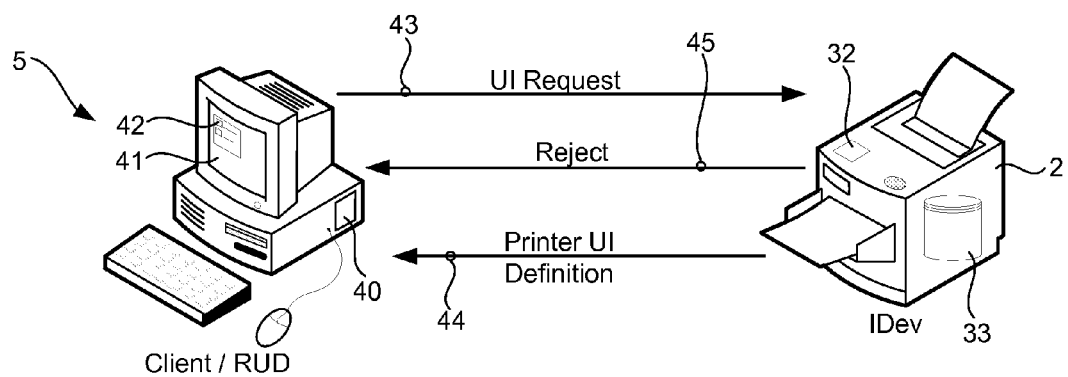
FIG. 4 is a diagram showing exemplary communication between a remote user device and an IDev.

In some embodiments, described with reference to FIG. 4, a user may then initiate a remote input job from an RUD/client PC 5 (e.g., desktop PC, laptop, PDA, etc) using a generic driver 40, which is capable of operating under the programmatic control of a controlling application 31. In these embodiments, the generic driver 40 may establish a bi-directional communication path 43 & 44 with the IDev 2. The communication path may be over many communication protocols, such as, but not limited to:

1. SOAP/XML
2. HTTP
3. FTP
4. Proprietary protocol over TCP/IP

In these embodiments, the generic printer driver 40 may be a driver which converts document data into printer ready data (e.g., Microsoft Windows compatible GDI printer driver), a direct print application (e.g., Sharp Color DPU), or a web browser (e.g., Microsoft Internet Explorer).

Once the generic driver 40 has established the communication path with the IDev 2, the generic driver 40 may request 43 from the IDev 2 a remote UI interface definition. The IDev 2 may then check if any controlling application with a remote UI is registered with the IDev 2. In some embodiments, the IDev may have more than one controlling application with a remote UI and may make a selection between registered applications based on a best-fit algorithm of by some other method. For example, the controlling application may register itself for either a class of:

1. Users
2. Scope (e.g., location, departmental association, network domain, etc).
3. Type (e.g., imaging job type: print, fax, file, scan, etc).

If the IDev 2 does not have at least one registered controlling application, the IDev 2 may send a rejection message 45 back to the generic driver 40. If the remote UI request 43 is rejected, the generic driver may either:

1. Terminate the process.
2. Try an alternate device.
3. Use a default User Interface, such as one built into the driver.

The remote UI request 43 from the driver 40 may also be granted/rejected for other reasons, such as:

1. User Authentication—the device may authenticate the user initiating the remote UI request.
2. Host Authentication—the device may be using IP/DNS name filtering to grant or reject access to a group of communication addresses or named devices.

If a controlling application is found and/or matched and access granted, the IDev 2 may send a remote UI definition 44 back to the generic driver 40. Generally, the responses 44 & 45 are on the same communication channel as the requests 43, but, in some embodiments, a separate communication channel may be used for back channel responses 44 & 45.

The generic driver 40 may then render a UI 42 on a display 41 according to the remote UI definition 44 it received. For example, in a Microsoft GDI print subsystem, a user may initiate a print/fax job by selecting Print in an application. The application may respond with a print dialog for selecting an installed printer (e.g., logical printer). The user would then select an installed printer associated with the generic driver. Once selected, the user can select a Properties button on the print dialog, which sends a command to the driver to render the driver specific print setting UI. Thus, in this example, when the user selects the properties button, the generic driver 40 would render the remote UI 42.

Additionally, a generic driver 40 may be directly associated with the IDev 2, such as by a port specification, or a virtual connection which is bound dynamically to the IDev 2, such as by:

1. User input of the IDev's communication address (e.g., IP address) or network domain name (e.g., DNS, WINS).
2. A device discovery method (e.g., WS-Discovery, SNMP discovery, etc).

Additionally, a generic driver 40 may also use programmatic aids in rendering the remote UI 42. For example, if the remote UI definition 44 is in an XML format, the generic driver 40 may use an XML style sheet (XSLT) to define how to render the XML data into a visual representation. Exemplary rendering aids may comprise:

1. The controlling application
2. The IDev 3. The driver.

In some embodiments, a user may be submitting an imaging job using a direct submit (i.e., driverless) application. In these cases, the direct submit application may perform the same remote UI functions as described for the generic driver 40.

In some embodiments, a user may be submitting an imaging job using a web browser. In these cases, the web browser may perform the same remote UI functions as described for the generic driver 40.

Figure 5:
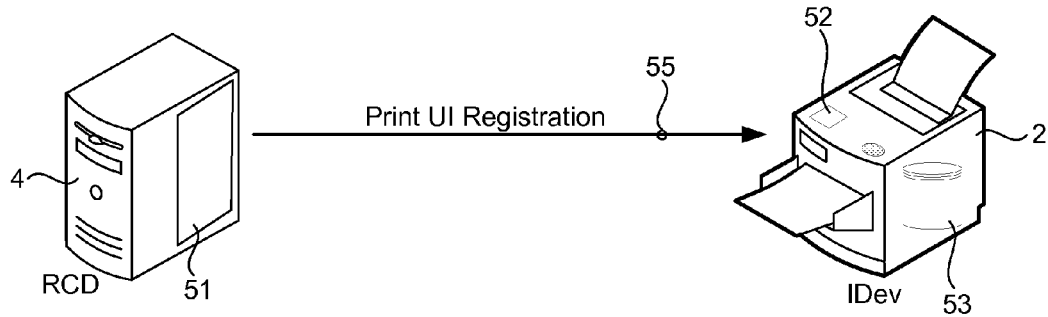
FIG. 5 is a diagram showing a UI registration being transmitted from an RCD to an IDev.

3. Controlling Application Registration—Embodiment 2—Remote UI Registered with IDev In some embodiments, described with reference to FIG. 5, a controlling application 51 may be registered with an IDev 2, such as by methods described above.

In these embodiments, the registration process differs from the above in that the controlling application 51 does not download the remote UI definition to the IDev 2. Instead, the remote UI definition remains resident with the controlling application. As part of the registration process, the registration may comprise:
1. A URI or URL identifying the location of the remote UI definition.
2. A programmatic interface call to the controlling application to request the controlling application to download the remote UI definition.

Figure 6:
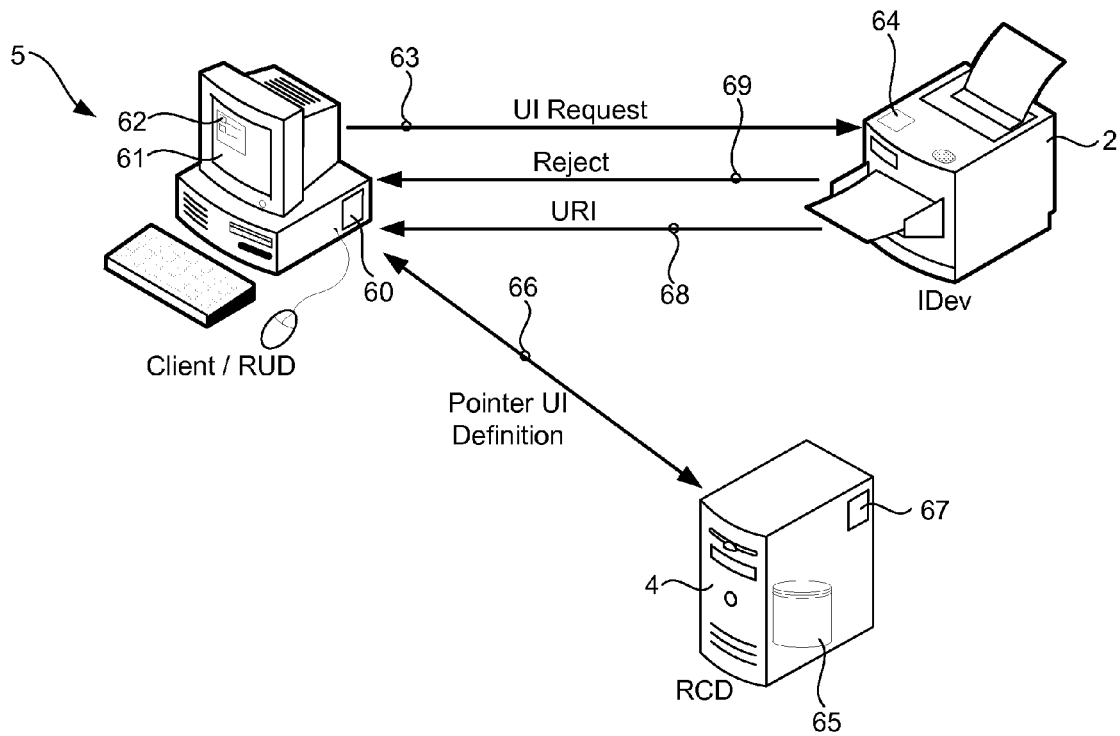
FIG. 6 is a diagram showing an exemplary embodiment comprising a UI definition being transmitted from an RCD to an RUD after transmission of the RCD URI to the RUD.

In some embodiments, described with reference to FIG. 6, a user may initiate a remote input job from a client PC/RUD 5 (e.g., desktop PC, laptop, PDA, etc) using a generic driver 60, which is capable of operating under the programmatic control of a controlling application 67. In these embodiments, the generic driver 60 may establish a bi-directional communication path 63 & 69 with an IDev 2, using any method such as those described above.

Once the generic driver 60 has established the communication path 63 & 69 with the IDev 2, the generic driver 60 may request 63 from the IDev 2 a remote UI interface definition. The IDev 2 may then check if any controlling application with a remote UI is registered with the IDev 2. In some embodiments, the IDev 2 may have more than one controlling application with a remote UI and may make a selection as describe above or by other methods.

If the IDev 2 does not have at least one registered controlling application, the IDev 2 may send a rejection message 69 back to the generic driver 60. If the remote UI request 63 is rejected, the generic driver 60 may respond as described above in relation to embodiments illustrated in FIG. 4.

If a controlling application 67 is found and/or matched and access is granted, the IDev 2 may send a remote UI URI 68 (or programmatic call) back to the generic driver 60. If the response is in the form of a URI, the generic driver 60 may directly pull 66 the remote UI definition from the controlling application's UI storage 65, which may be remote or local to the RCD 4. In other embodiments, a programmatic call 68, sent to the generic driver 60 may establish a communication channel 66 with the controlling application 67 over which a remote UI definition (based on the programmatic call) may be requested. The controlling application 67 may then respond by transmitting the remote UI definition to the generic driver 60. Many protocols and data formats may be used for communications and remote UI definitions such as those described earlier in relation to other embodiments.

In other embodiments, a user may be submitting an imaging job using a direct submit (i.e., driverless) application. In these embodiments, the direct submit application may perform the same remote UI functions as described for the generic driver above.

In other embodiments, a user may be submitting an imaging job using a web browser. In these embodiments, the web browser application may perform the same remote UI functions as described for the generic driver above.

4. Controlling Application Registration—Embodiment 3—RUD URI Passed to IDev

Figure 7:
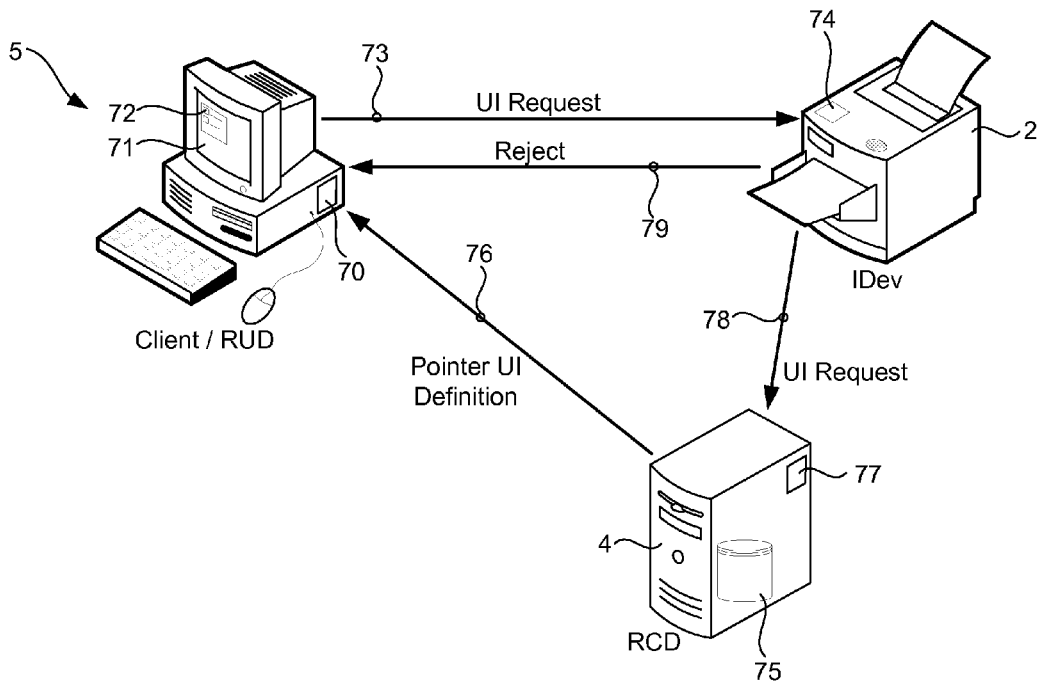
FIG. 7 is a diagram showing an exemplary embodiment comprising a UI definition being transmitted from an RCD to an RUD after a request from the IDev to the RCD.

In some embodiments, described with reference to FIG. 7, a user may initiate a remote input job from a client PC/RUD 5 (e.g., desktop PC, laptop, PDA, etc) using a generic driver 70, which is capable of operating under the programmatic control of a controlling application 77. In these embodiments, the generic driver 70 may establish a bi-directional communication path 73 & 79 with an IDev 2, using any method such as those described above.

Once the generic driver 70 has established the communication path 73 & 79 with the IDev 2, the generic driver 70 may request 73 from the IDev 2 a remote UI interface definition. The IDev 2 may then check if any controlling application with a remote UI is registered with the IDev 2. In some embodiments, the IDev 2 may have more than one controlling application with a remote UI and may make a selection as describe above or by other methods.

If the IDev 2 does not have at least one registered controlling application, the IDev 2 may send a rejection message 79 back to the generic driver 70. If the remote UI request 73 is rejected, the generic driver 70 may respond as described above in relation to embodiments illustrated in FIG. 4.

If a controlling application 77 is found and/or matched and access is granted, the IDev 2 may send a remote UI URI, programmatic call or another message 78 to the controlling application 77 requesting that the UI definition be sent to the generic driver 70. The controlling application 77 may then send 76 a UI definition 75 directly to the generic driver 70 identified in the message 78. The UI definition may be read from the controlling application's UI storage 65, which may be remote or local to the RCD 4. Many protocols and data formats may be used for communications and remote UI definitions such as those described earlier in relation to other embodiments.

In other embodiments, a user may be submitting an imaging job using a direct submit (i.e., driverless) application. In these embodiments, the direct submit application may perform the same remote UI functions as described for the generic driver above.

In other embodiments, a user may be submitting an imaging job using a web browser. In these embodiments, the web browser may perform the same remote UI functions as described for the generic driver above.

Figure 8:
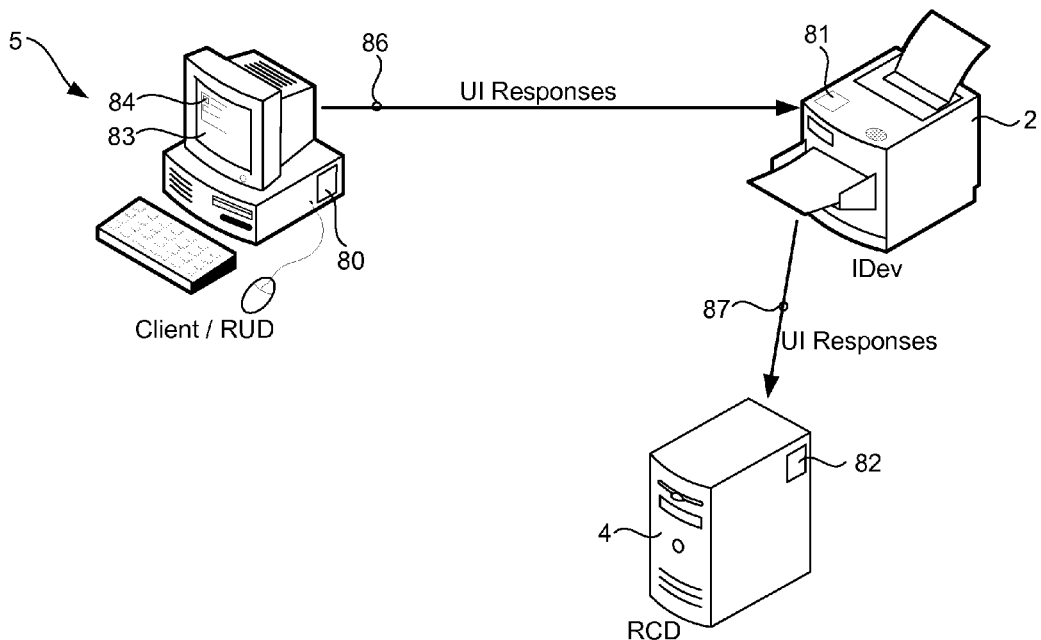
FIG. 8 is a diagram showing an exemplary transmission of UI responses.

5. Remote Job Input—Embodiment 1—Client/RUD Interfaces with Controlling Application Via IDev In some embodiments, described with reference to FIG. 8, a user may enter a selection (e.g., cursor, mouse selection, text input) into a generic driver's rendered remote UI 83. The input responses 85 may then be recorded by the generic driver 80. The input responses 85 may be associated with a specific selection control element (e.g., button selection, input box), a grid coordinate that can be mapped back to a selection control element or by some other association method.

Exemplary input responses may comprise:
1. Click~button or checkbox selected/deselected.
2. Item~index of an element within an enumerated selection list.
3. Text~text entered into input box.

The input responses may then be sent 86 back to the IDev 2. The input responses 86 may be sent over the same communication channel used for a remote UI request from the IDev 2, or another (e.g., asynchronous) communication channel specifically for inputting a remote job.

The IDev 2 may then forward 87 the input responses to the controlling application 82. In some embodiments, the format of the input responses 86 between the RUD 5 and IDev 2 may be different than the format of the responses 87 between the IDev 2 and controlling application 82. In such a case, the IDev 2 may translate the input responses into a format compatible with the controlling application 82. The IDev 2 may use many methods to establish a communication path and forward the input responses to the controlling application, such as by using a SOAP/XML web service.

Additionally, the input responses 86 between the RUD/client 5 and IDev 2 and/or the responses 87 between the IDev 2 and controlling application 82 may be encrypted and/or compressed.

Figure 9:
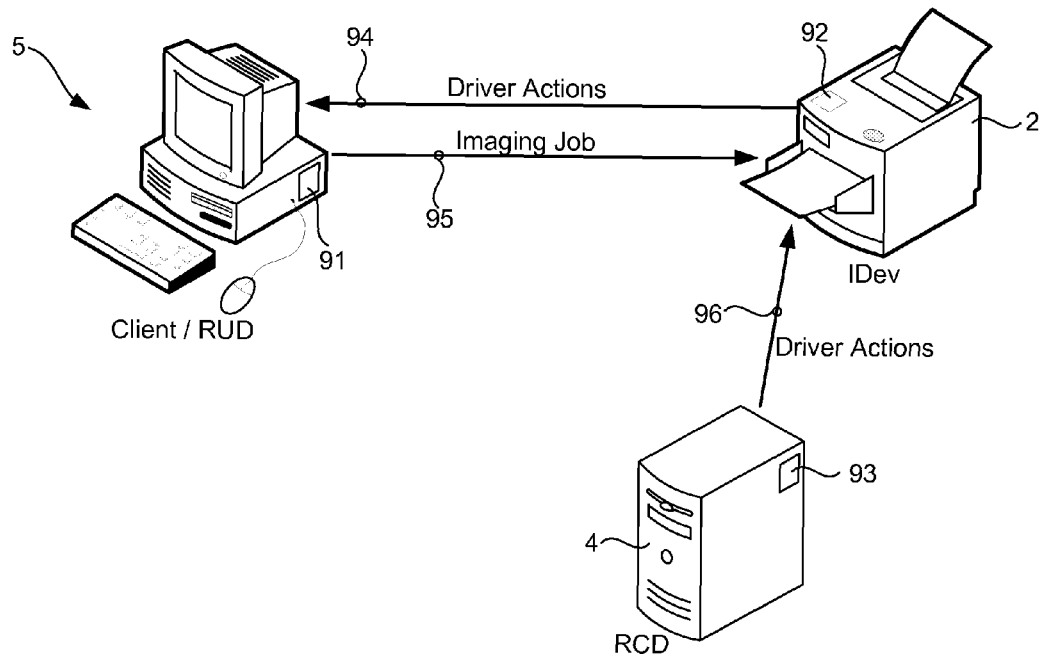
FIG. 9 is a diagram showing an exemplary transmission of driver actions.
Figure 10:
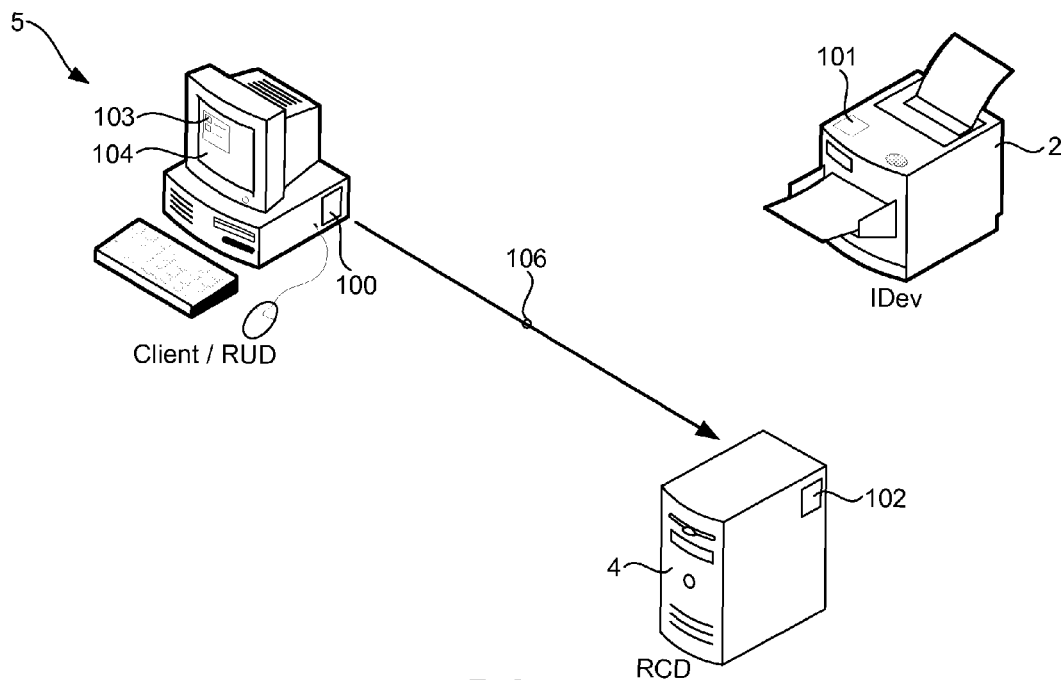
FIG. 10 is a diagram showing an exemplary transmission of input responses to an RCD.

Some embodiments of the present invention may be described with reference to FIG. 9. In these embodiments, upon receipt of responses, the controlling application 93 interprets the responses. Based on the input data and associated control, the responses are converted into driver actions 96, specific to the generic driver 91. For example, printer drivers in the MS GDI print subsystem use a DEVMODE data structure to specify print settings. In this exemplary embodiment, the controlling application 93 may convert the responses (e.g., print settings) into the corresponding binary settings in a DEVMODE structure compatible with the generic driver 91.

In some embodiments, the controlling application 93 may convert the responses into a common job setting language compatible with the generic driver 91, such as representing the actions in an XML format.

In some embodiments, the controlling application may send the driver actions to the IDev 2. In some embodiments, the IDev controller 92 will receive the actions. The controlling application 93 may use the same communication channel by which the IDev 2 sends input responses to the controlling application 93, or another communication channel.

The IDev 2 may then forward the driver actions 94 to the generic driver 91. In some embodiments, the data format of the driver actions 94 between the IDev 2 and generic driver 91 is the same as the format of the driver actions 96 sent between the controlling application 93 and the IDev 2, and they may be forwarded without modification. In some embodiments, the formats may be different, and the IDev 2 may translate the driver actions 96 from the controlling application 93 into a format compatible with the generic driver 91. The IDev 2 may use any communication channel to send the driver actions back to the generic driver 91, such as the same communication channel used to receive the remote UI responses from the generic driver, or another communication channel.

The generic driver 91 may interpret the driver actions 94 received from the IDev 2 into print settings, and may perform the associated operations to produce an imaging job 95 which is compatible with the IDev 2 and which reflects the user's input intentions. The imaging job 95 is then sent by the generic driver 91 to the IDev 2 for rendering/outputting. The imaging job 95 may be sent by any communication channel, such as the communication channel used to receive the driver actions from the IDev 2, or another communication channel (e.g., legacy printing port~LPR, RAW 9100).

In some embodiments, a user may be submitting an imaging job using a direct submit (i.e., driverless) application. In these cases, the direct submit application may perform the same remote UI functions as described for the generic driver 91.

In some embodiments, a user may be submitting an imaging job using a web browser. In these cases, the web browser may perform the same remote UI functions as described for the generic driver 91.

6. Remote Job Input—Embodiment 2—Client Interfaces Directly with Controlling Application In some embodiments of the present invention, a user may enter selections into a generic driver's rendered remote UI 103 on a touch-screen display 104 or some other UI. The input responses 106 are then recorded by the generic driver 100. The input responses 105 may be associated with a specific selection control element, a grid coordinate that can be mapped back to a selection control element or they may be associated by some other relationship.

The input responses 106 may then be sent directly to the controlling application 102. The input responses 106 may be sent by any communication channel and data protocol. For example, if the generic driver 100 received a remote UI definition directly from a controlling application 102, the generic driver 100 may use the same communication channel. Otherwise, the generic driver 100 may establish another communication channel, such as over TCP/IP to transmit the data, such as a SOAP/XML message.

Figure 11:
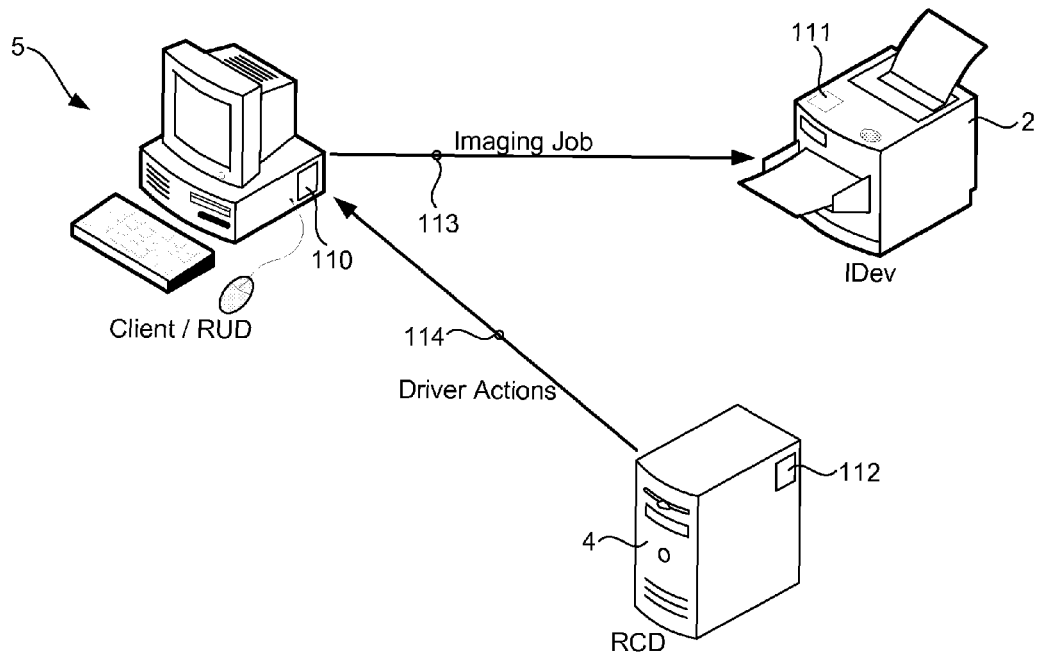
FIG. 11 is a diagram showing an exemplary transmission of driver actions and an imaging job.

In some embodiments, the input responses between the client/RUD 5 and the controlling application 102 may be encrypted and/or compressed. Some embodiments of the present invention may be described with reference to FIG. 11. In these embodiments, the controlling application 112 may interpret received responses based on input data and associated control functions. The interpreted responses may then be converted into driver actions 114, specific to the generic driver 110, such as in the methods described earlier.

In some embodiments, the controlling application 112 may convert received actions into a common job setting language compatible with the generic driver 110, such as representing the actions in an XML format.

A controlling application 112 may send driver actions 114 to the generic driver 110. The controlling application 112 may use the same communication channel by which the generic driver 112 sent input responses, or another communication channel.

The generic driver 110 may then interpret the driver actions 114 received from the controlling application 112 into print settings and perform the associated operations to produce an imaging job 113 which is compatible with the IDev 2 and which reflects the user's input intention. The imaging job 113 may then be sent by the generic driver 110 to the IDev 2 for rendering/outputting. The imaging job may be sent by any communication channel, such as using a SOAP/XML web service or a legacy printing port (e.g., LPR, RAW 9100).

In other embodiments, a user may be submitting an imaging job using a direct submit (i.e., driverless) application. In these cases, the direct submit application may perform the same remote UI functions as described for the generic driver 110.

7. Remote Job Input—Embodiment 3—Client Interfaces with Controlling Application Via IDev 2

Figure 12:
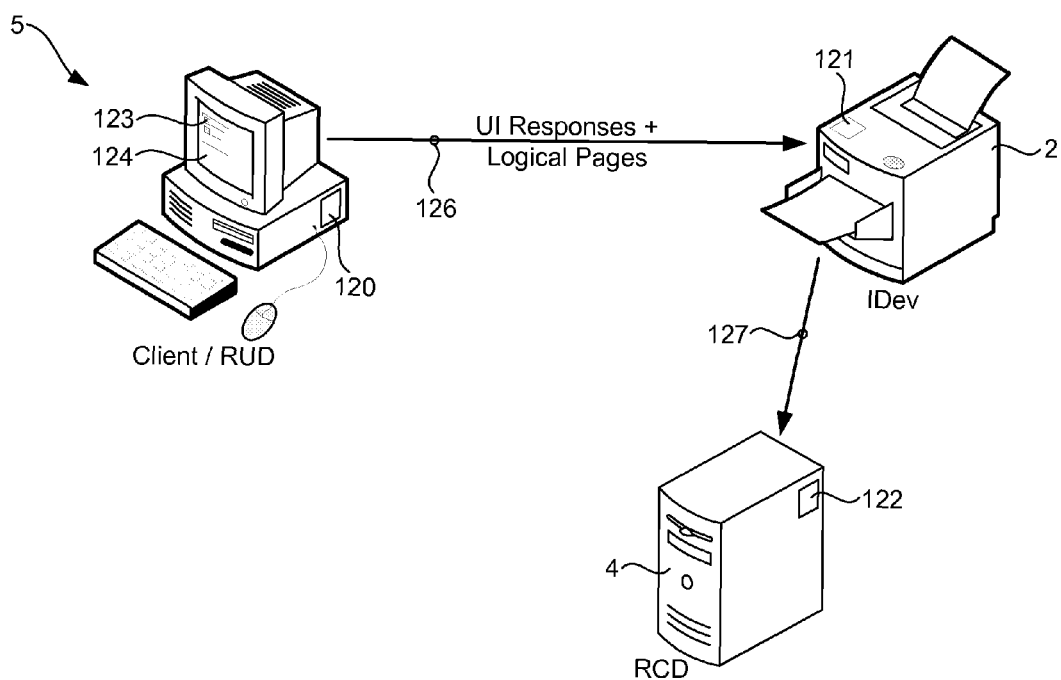
FIG. 12 is a diagram showing an exemplary transmission of UI responses and logical pages.

In some embodiments of the present invention, described with reference to FIG. 12, a user may enter selections into a generic driver's rendered remote UI 123. The input responses may then be recorded by the generic driver 120. The input responses may be associated with a specific selection control element, a grid coordinate that can be mapped back to a selection control element or they may be associated by some other relationship.

In some embodiments, the generic driver 120 may convert the document data into a print (or fax or file) format compatible with the IDev 2 as logical pages (i.e., not formatted for sheet placement, sheet assembly and outputting).

The input responses and logical pages 126 may then be sent back to the IDev 2. The input responses/logical pages 126 may be sent over the same communication channel that was used for a remote UI request from the IDev 2, or another (e.g., asynchronous) communication channel specifically for inputting a remote job.

In some embodiments, the IDev 2 may store the logical pages and then forward the input responses 127 to the controlling application 122. In some embodiments, the format of the input responses 126 between the client/RUD 5 and the IDev 2 may be different than the format of the UI responses 127 between the IDev 2 and controlling application 122. In such a case, the IDev 2 may translate the input responses 126 into a format compatible with the controlling application 122. The IDev 2 may use any method to establish a communication path and forward the input responses to the controlling application, such as by using a SOAP/XML web service.

In some embodiments, the input responses between the client/RUD 5 and the IDev 2 and/or between the IDev 2 and the controlling application 122 may be encrypted and/or compressed.

Figure 13:
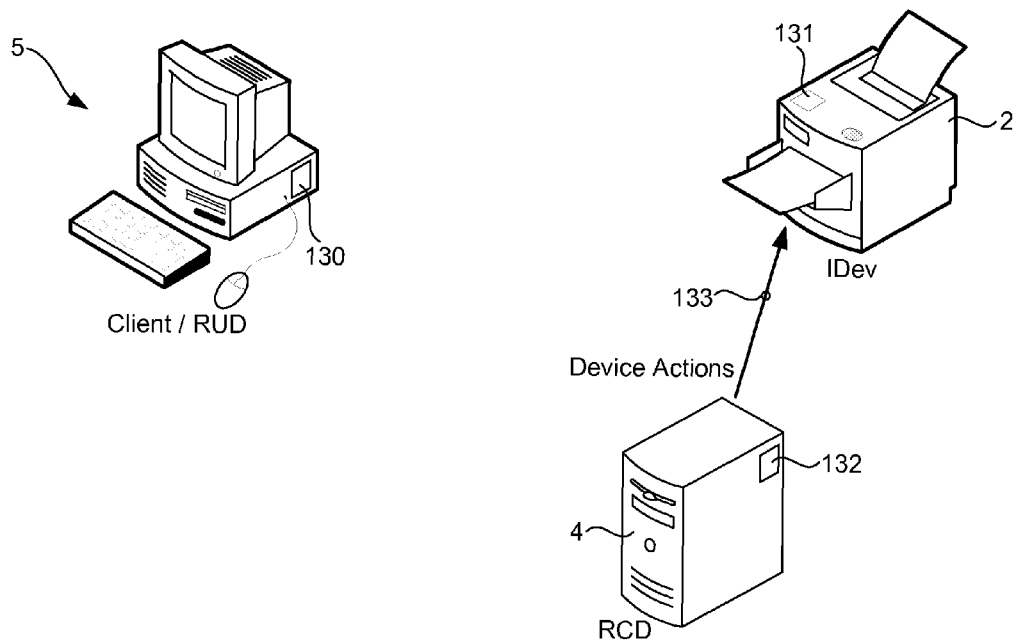
FIG. 13 is a diagram showing an exemplary transmission of device actions from an RCD to and IDev.

In some embodiments of the present invention, described with reference to FIG. 13, a controlling application 132 may interpret received responses based on input data and associated control functions. The interpreted responses may then be converted into device actions 133, specific to the IDev 2. For example, HP PJL/PCL compatible printers accept print settings in a PJL (Printer Job Language) format. In this example, the controlling application 132 converts the responses (e.g., print settings) into the corresponding PJL commands compatible with the IDev 2.

In some embodiments, the controlling application 132 may convert actions into a common job setting language compatible with the IDev 2, such as by representing the actions in an XML format.

A controlling application may send device actions 133 to the IDev controller 131 in the IDev 2. The controlling application 132 may use the same communication channel by which the IDev 2 sends input responses, or another communication channel.

The IDev 2 may then retrieve the logical pages and interpret the device actions 133 received from the controlling application 132 into print settings. The IDev 2 may also perform the associated operations to render/output the imaging job.

In other embodiments, a user may be submitting an imaging job using a direct submit (i.e., driverless) application. In these cases, the direct submit application may perform the same remote UI functions as described for the generic driver 130.

Figure 14:
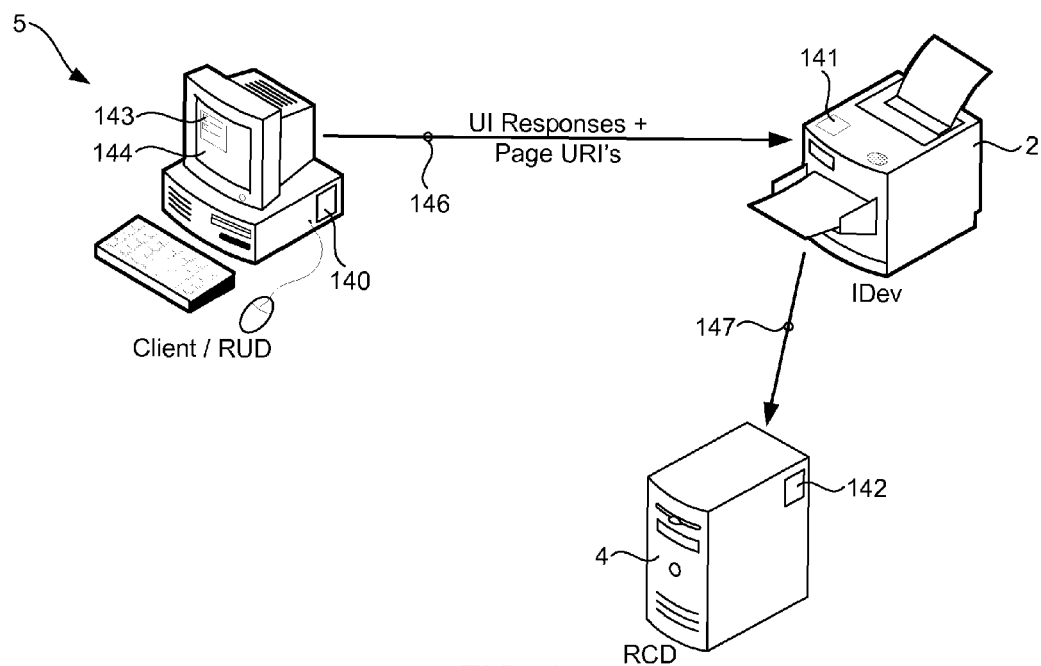
FIG. 14 is a diagram showing an exemplary transmission of UI responses and page URI's.
Figure 15:
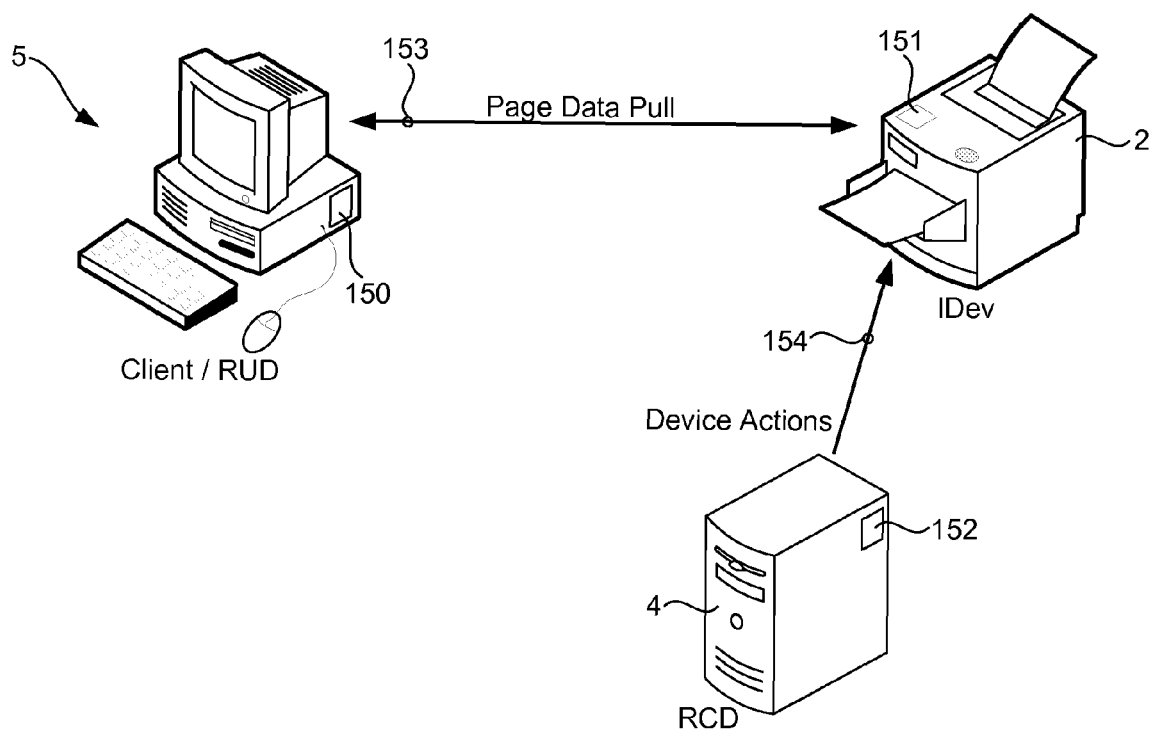
FIG. 15 is a diagram showing an exemplary transmission of device actions and a page data pull.

8. Remote Job Input—Embodiment 4—Client Interfaces Directly with Controlling Application In some embodiments of the present invention, described with reference to FIG. 14, a user may enter a selection into a generic driver's rendered remote UI 143. The input responses 145 may then be recorded by the generic driver 140. The input responses may be associated with a specific selection control element, a grid coordinate which can be mapped back to a selection control element or they may be associated by some other relationship. In some embodiments, the generic driver 140 may convert the document data into a print (or fax or file) format compatible with the IDev 2 as logical pages (i.e., not formatted for sheet placement, sheet assembly and outputting). The logical pages may then be retained by the generic driver 140.

In some embodiments, input responses and URIs (Uniform Resource Indicators) 146 to the logical pages may be sent to the IDev 2. The input responses/Page URIs 146 may be sent over the same communication channel that was used for a remote UI request from the IDev 2, or another (e.g., asynchronous) communication channel specifically for inputting a remote job.

The IDev 2 may store the Page URIs and forward the input responses 147 to the controlling application 142. In some embodiments, the format of the input responses between the client/RUD 5 and IDev 2 may be different than between the IDev 2 and controlling application 142. In such a case, the IDev 2 may translate the input responses 146 into a format compatible with the controlling application 142. The IDev 2 may use any method to establish a communication path and forward the input responses 147 to the controlling application, such as by using a SOAP/XML web service.

In some embodiments of the present invention, a controlling application 142 may interpret responses received at a UI, based on the input data and associated control functions. The interpreted responses may then be converted into device actions, specific to the IDev 2, as described in relation to other embodiments above.

In some embodiments, a controlling application 152 may convert the actions into a common job setting language compatible with the IDev 2, such as by representing the actions in an XML format.

The controlling application 152 may then send the device actions 154 to an IDev 2. The controlling application may use the same communication channel by which the IDev 2 sent input responses, or another communication channel.

The IDev 2 may then pull or request 153 any associated logical pages from the generic driver 150, using the page URIs and interpret the device actions received from the controlling application into print settings. The IDev 2 may also perform the associated operations to render/output the imaging job.

In some embodiments, a user may be submitting an imaging job using a direct submit (i.e., driverless) application. In these cases, the direct submit application may perform the same remote UI functions as described for the generic driver 150.

In some embodiments, a user may be submitting an imaging job using a web browser. In these cases, the web browser may perform the same remote UI functions as described for the generic driver 150.

While many embodiments described above were written in the context of an exemplary print job, other embodiments may comprise other remote input imaging operations which render an output in either soft or hardcopy format, such as fax, scan, file, publish, display and format conversion.

Embodiments of the present invention may comprise elements of the print subsystems of the Microsoft Windows operating system, Apple MacIntosh Operating System, Linux Operating System, System V Unix Operating Systems, BSD Unix Operating Systems, OSF Unix Operating Systems, IBM Mainframe MVS Operating System, and IBM AS/400.

The terms and expressions which have been employed in the foregoing specification are used therein as terms of description and not of limitation, and there is no intention in the use of such terms and expressions of excluding equivalence of the features shown and described or portions thereof, it being recognized that the scope of the invention is defined and limited only by the claims which follow.

What is claimed is:

1. A method for third-party control of a remotely-controlled imaging device in a system with a networked imaging device (IDev), remote computing device (RCD) and a remote user device (RUD), said method comprising:

registering a controlling application executing on said RCD with said IDev, wherein said registering comprises sending a remote user interface definition (RUID) from said RCD to said IDev and establishing a bi-directional communication between said RCD and said IDev, wherein said registering enables said IDev to display said controlling application's user interface (UI) content on an IDev display and enables said IDev to accept user input relative to said UI content and forward said user input to said RCD and wherein said registering grants said controlling application control over an IDev function;

extending control of said IDev function to said RUD by sending said RUID from said RCD to said RUD, wherein said RUD comprises a generic driver responsive to said RUID, wherein said generic driver responds to receipt of said RUID by displaying said controlling application's user interface (UI) content on an RUD display and enables said RUD to accept user input relative to said UI content and forward said user input to said RCD;

receiving a user interface (UI) response at said RUD;

forwarding said UI response to said RCD;

converting said UI response to an IDev command with said RCD; and receiving logical pages of an imaging job at said RCD from said RUD and forwarding said logical pages to said IDev with said IDev command, thereby initiating said IDev function.

2. A method as described in claim 1, wherein said RUD's generic driver comprises a programmatic control interface.

3. A method as described in claim 2, wherein said UI response is also converted into a driver action and said driver action is sent to said generic driver.

4. A method as described in claim 2, wherein said IDev command instructs said IDev to perform said function with logical pages received from said generic driver.

5. A method for third-party control of a remotely-controlled imaging device, said method comprising:

registering a controlling application executing on a remote computing device (RCD) with an imaging device (IDev), wherein said registering comprises receiving a remote user interface definition (RUID) from said RCD at said IDev and establishing a bi-directional communication between said RCD and said IDev;

granting said controlling application control over an IDev function in response to receiving said RUID;

extending control of said IDev function to a remote user device (RUD) by sending said RUID from said RCD to said RUD, wherein said RUD comprises a generic driver responsive to said RUID, wherein said generic driver responds to receipt of said RUID by displaying said controlling application's user interface (UI) content on an RUD display and enables said RUD to accept user input relative to said UI content and forward said user input to said RCD;

receiving an IDev command at said IDev from said RCD, wherein said IDev command has been translated by said RCD from user input received at said RUD;

receiving logical pages of an imaging job at said IDev from said RCD wherein said logical pages were received at said RCD from said RUD and forwarded to said IDev with said IDev command, thereby initiating said IDev function; and performing said IDev function according to said IDev command.

6. A method as described in claim 5, wherein said IDev command instructs said IDev to perform said function with said logical pages received from said RUD.

7. A method as described in claim 5, wherein said IDev command instructs said IDev to perform said function with logical pages received from said generic driver.

8. A method as described in claim 5, wherein control is provided to said controlling application after discovery of said controlling application by said IDev with a service discovery protocol.

9. A method for third-party control of a remotely-controlled imaging device, said method comprising:

gaining remote control of an imaging device (IDev) function at a remote user device (RUD) by receiving a remote user interface definition (RUID) from a remote computing device (RCD);

processing said RUID with a generic driver responsive to said RUID, wherein said generic driver responds to receipt of said RUID by displaying a controlling application's user interface (UI) content on an RUD display;

configuring said RUD to accept user input relative to said UI content and to forward said user input to said RCD;

wherein said controlling application is executing on said RCD and said controlling application is registered with said IDev thereby establishing a bi-directional communication between said RCD and said IDev and wherein said controlling application controls an IDev function via said bi-directional communication;

receiving user input in response to said displaying;

obtaining logical pages of an imaging job based on said user input; and sending said user input response and said logical pages said controlling application on said RCD with instructions instructing said RCD to forward said logical pages to said IDev with an IDev command identified in said user input.

10. A method as described in claim 9, wherein said generic driver is under the programmatic control of said controlling application.

11. A method as described in claim 9, wherein said RUID is received from an IDev.

12. A method as described in claim 9, wherein said RUID is received from an RCD.

* * * * *